(12) United States Patent
Yoshida

(10) Patent No.: US 11,856,345 B2
(45) Date of Patent: Dec. 26, 2023

(54) REMOTE CONTROL APPARATUS, REMOTE CONTROL METHOD, AND PROGRAM

(71) Applicant: NEC Corporation, Tokyo (JP)

(72) Inventor: Hiroshi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 426 days.

(21) Appl. No.: 17/254,125

(22) PCT Filed: Jun. 27, 2019

(86) PCT No.: PCT/JP2019/025587
§ 371 (c)(1),
(2) Date: Dec. 18, 2020

(87) PCT Pub. No.: WO2020/004546
PCT Pub. Date: Jan. 2, 2020

(65) Prior Publication Data
US 2021/0274271 A1    Sep. 2, 2021

(30) Foreign Application Priority Data
Jun. 28, 2018    (JP) .................................. 2018-123230

(51) Int. Cl.
*H04Q 9/02*    (2006.01)
*H04L 43/0852*    (2022.01)

(52) U.S. Cl.
CPC ........... *H04Q 9/02* (2013.01); *H04L 43/0852* (2013.01); *H04Q 2209/10* (2013.01); *H04Q 2209/70* (2013.01)

(58) Field of Classification Search
CPC .. H04Q 9/02; H04Q 2209/10; H04Q 2209/70; H04L 43/0852; H04L 41/145;
(Continued)

(56) References Cited

U.S. PATENT DOCUMENTS 6,243,610 B1    6/2001    Iino et al.
7,492,707 B2    2/2009    Tanaka et al.
(Continued)

FOREIGN PATENT DOCUMENTS

EP    1619912 A1    1/2006
JP    3269792 B2    4/2002
(Continued)

OTHER PUBLICATIONS

International Search Report corresponding to PCT/JP2019/025587, 1 page, dated Sep. 10, 2019.

*Primary Examiner* — Afshawn M Towfighi
(74) *Attorney, Agent, or Firm* — Wilmer Cutler Pickering Hale and Dorr LLP

(57) ABSTRACT

A remote control apparatus measures a communication delay in a communication network, generates a probability distribution of the communication delay, generates, based on the probability distribution of the communication delay, a plurality of arrival patterns, including an arrival time of a control input at a control target, predicts a state of the control target at a time of arrival of the control input, calculates a control input set by calculating a plurality of control inputs corresponding respectively to the plurality of states predicted, determines a control input to be outputted to the control target, based on a result of statistical processing applied on the control input set calculated.

20 Claims, 17 Drawing Sheets

(58) Field of Classification Search
CPC ... H04L 41/142; H04L 41/147; H04L 41/149; G08C 2201/50; G08C 17/02
See application file for complete search history.

(56) References Cited

U.S. PATENT DOCUMENTS

| | | |
|---|---|---|
| 9,256,224 B2 | 2/2016 | Herzog |
| 10,187,279 B2 | 1/2019 | Ishii et al. |
| 2005/0227716 A1 | 10/2005 | Tanaka et al. |
| 2013/0024416 A1* | 1/2013 | Herzog ............... G06N 7/00 706/52 |
| 2015/0304193 A1* | 10/2015 | Ishii ............... H04L 67/125 709/224 |
| 2016/0110651 A1 | 4/2016 | Herzog |
| 2019/0215254 A1 | 7/2019 | Yoshida |

FOREIGN PATENT DOCUMENTS

| | | |
|---|---|---|
| JP | 4955237 B2 | 6/2012 |
| JP | 2016-215357 A | 12/2016 |
| WO | WO-2004/098225 A1 | 11/2004 |
| WO | WO-2013/012583 A1 | 1/2013 |
| WO | WO-2013/157386 A1 | 10/2013 |
| WO | WO-2018/034191 A1 | 2/2018 |

\* cited by examiner

REMOTE CONTROL APPARATUS, REMOTE CONTROL METHOD, AND PROGRAM

CROSS-REFERENCE TO RELATED APPLICATIONS

This application is a national stage application of International Application No. PCT/JP2019/025587 entitled "REMOTE CONTROL APPARATUS. REMOTE CONTROL METHOD. AND PROGRAM." filed on Jun. 27, 2019, which claims the benefit of the priority of Japanese Patent Application No. 2018-123230 filed on Jun. 28, 2018, the disclosures of each of which are hereby incorporated by reference in their entirety.

In recent years, as concept of the Internet of Things (IoT) has become more infiltrated, a variety of robots and machines have been connected to wireless Internet protocol (IP) networks. With the development of such network technologies, it has become possible to control the robot and/or machine in real time from a remote location.

In the future, remote control of robot and/or machine is expected to play an increasingly important role in society, for example, in transportation of goods, etc., using an unmanned aerial vehicle (UAV) and/or an unmanned ground vehicle (UGV), remote driving of a vehicle, investigation of a disaster area and emergency service using a robot and so forth.

However, there is a possibility of occurrence of a large communication delay and jitter (fluctuation) in a wireless IP network due to a characteristic of wireless communication that communication cannot be guaranteed (i.e., connection to a network cannot be guaranteed) and a queuing characteristic in an IP network. A communication delay is called "dead time" in a control theory for robot and so on, which is treated as a major factor that impairs a stability of a remote control system.

It is known that a state prediction control approach is an effective way to stabilize a remote control system having the above-mentioned delay time (dead time) (see Patent Literature 1 (PTL1) and PTL2). State prediction control is based on prediction of a state of a control target in the future in which a control input to be transmitted from now to a control system is expected to arrive, based on an observed state(s) and a delay time(s). Thus, if a state of the control target can be predicted accurately, the control system can be stabilized by transmitting a control input with a predicted state fed back thereinto. In this document, a "control input" is defined as information inputted from a controller to a control target. For example, when a driving source such as a motor is included in the control target, a voltage value applied to the motor corresponds to a "control input".

PTL 1: JP Patent Publication No. 4955237
PTL 2: JP Patent Publication No. 3269792

SUMMARY

First, a remote control system over a network to which the present application disclosure is directed will be described, and then a problem(s) in a network with a large delay jitter will be described.

FIG. 15 illustrates an example of a remote control system to which the present application disclosure is directed. Referring to FIG. 15, a control target (Target System) and a controller (Remote Controller) are connected by a network. A communication delay occurring in the network is a dead time of the control system.

The remote control system, as illustrated in FIG. 15, can be formulated as the following Equations 1 and 2.

$$\dot{x}(t) = Ax(t) + Bu(t - \tau_{in}) \qquad \text{[Equation 1]}$$

$$y(t) = x(t - \tau_{out}) \qquad \text{[Equation 2]}$$

In the Equations 1 and 2, x is a state variable of the control target, u is a control input, A and B are matrices representing a dynamics of the control system, and y is an observable quantity. Further, $\tau_{in}$ is a communication delay until the control input u arrives at the control target, and $\tau_{out}$ is a communication delay of a state fed back from the control target.

In the remote control system, the communication delay occurs in both an outbound and an inbound paths. However, a sum of communication delays of the outbound and the inbound paths is important as a dead time of the remote control system. That is, That is $\tau = \tau_{in} + \tau_{out}$ is a meaningful "dead time" in the remote control system, and there is no need to consider a ratio of the communication delay $\tau_{in}$ in the outbound path to the communication delay rout in the inbound path.

On taking the above into consideration, a model of the remote control system expressed by Equations 1 and 2 can be simplified as the following Equations 3 and 4.

$$\dot{x}(t) = Ax(t) + Bu(t - \tau) \qquad \text{[Equation 3]}$$

$$y(t) = x(t) \qquad \text{[Equation 4]}$$

According to Equations 3 and 4, the state prediction control predicts a future state x(t+τ) corresponding to a delay time τ of arrival of the control input u at the control target, and calculates the control input u(t) based on the predicted state. If the control target is a linear system as in Equation 3, a predicted future state $\hat{x}(t+\tau)$ is obtained analytically as in the following Equation 5.

$$\hat{x}(t + \tau) = e^{A\tau} y(t) + \int_{t-\tau}^{t} e^{A(t-s)} Bu(s) ds \qquad \text{[Equation 5]}$$

In Equation 5, an integral term on the right-hand side indicates a behavior due to the control input from u(t−τ) already transmitted with not yet arrived, to the control input u(t−0). The integral term can be calculated by referring to a history of control inputs previously transmitted by the controller.

Here, in a remote control system via a communication network, transmission of a control input is, as a matter of course, discrete. In such a discrete-time remote control system, depending on dynamics of the control target and a time constant, for example, packets storing the control input u will be transmitted to the control target at a constant time interval, such as from several milliseconds (msec) to several hundred msec.

In doing so, if a delay of the communication network is constant and there is no jitter, an interval between times of arrival of a control input transmitted at the control target is also constant. In this case, the control input u actually inputted to the control target is an equally spaced step function, as illustrated in FIG. 16. Here, for ease of understanding, a period of transmission of the control input by the controller (e.g., a period of about a few msec to a few hundred msec) is assumed to be a time unit. That is, the controller transmits the control input u (a packet including the control input u) to the control target at time: t=0, 1, 2, . . . . In that case, when it is assumed that there is no occurrence of a communication delays, the control input u to the control target can be expressed as a continuous-time function $u_e(t)$ in the following Equation 6. "e" in the continuous-time function $u_e$ indicates an equal interval.

$$u_e(t) = \begin{cases} u_0 & (0 \leq t < 1) \\ u_1 & (1 \leq t < 2) \\ \vdots & \vdots \\ u_{T-1} & (T-1 \leq t < T) \end{cases} \quad \text{[Equation 6]}$$

However, as described above, in a network, especially in a wireless IP network, a communication delay often occurs in the control input transmitted by the controller before arriving at the control target, and the communication delay has a large jitter. In this case, the control input u(t) inputted to the control target, is an unequally spaced step function, as illustrated in FIG. 17. In FIG. 17, a dark-colored line designates a case where jitter is included in the communication delay, while a light-colored line designates a case where jitter is not included in the communication delay.

According to FIG. 17, if an arrival time of the control input ($u_0, u_1, \ldots$) at the control target is $t_0, t_1, \ldots$, respectively, the function $u_u(t)$ of the control input applied to the control target can be expressed as the following Equation 7. It is noted that "u" in the function $u_u(t)$ denotes unequal interval.

$$u_u(t) = \begin{cases} u_0 & (t_0 \leq t < t_1) \\ u_1 & (t_1 \leq t < t_2) \\ \vdots & \vdots \\ u_{T-1} & (t_{T-1} \leq t < t_T) \end{cases} \quad \text{[Equation 7]}$$

In the state prediction control represented by PTL 1 and PTL 2, the state prediction is performed by assigning the control input $u_e(t)$, which has an equal transmission interval with respect to the control target, to the linear system indicated by Equation 5. However, in a communication environment with a delay jitter, the actual control input is a function $u_u(t)$ as indicated in Equation 7. As a result, there may be an occurrence of a large error in the predicted value z of a state of the control target.

A prediction error of a state of the control target has a direct impact on a deviation from an appropriate control input (e.g., a feedback Kx of a true state x; where K is a feedback gain) in state feedback control. On the other hand, it is difficult to accurately predict a delay and its jitter. Similarly, it is practically impossible to accurately predict the input $u_u(t)$ affected by a delay jitter.

It is a main object of the present invention to provide a remote control apparatus, a remote control method and a program that contribute to improvement of stability of remote control via a communication network with a delay jitter.

According to a first aspect of the present invention or disclosure, there is provided a remote control apparatus, including:
- a delay measurement part that measures a communication delay in a communication network based on a transmission time of a control input and a reception time of a state transmitted from a control target;
- a probability distribution generation part that generates a probability distribution of the communication delay in the communication network based on a history of the communication delay measured;
- an arrival pattern generation part that generates, based on the probability distribution of the communication delay, a plurality of arrival patterns, an individual pattern including, as an element thereof, a time of arrival of a control input already transmitted or to be transmitted at the control target;
- a state prediction part that predicts a state of the control target at a time of arrival of the control input to be transmitted, for an individual one of the plurality of arrival patterns generated,
- a set calculation part that calculates a control input set by calculating a plurality of control inputs corresponding respectively to the plurality of states predicted; and
- a control input determination part that determines a control input to be outputted to the control target, based on a result of statistical processing applied on the control input set calculated.

According to a second aspect of the present invention or disclosure, there is provided a remote control method for a remote control apparatus controlling a control target via a communication network, the method including,
- measuring a communication delay in the communication network based on a transmission time of a control input and a reception time of a state transmitted from the control target;
- generating a probability distribution of the communication delay in the communication network based on a history of the communication delay measured;
- generating, based on the probability distribution of the communication delay, a plurality of arrival patterns, an individual pattern including, as an element, an arrival time of a control input already transmitted or to be transmitted at the control target;
- predicting a state of the control target at a time of arrival of the control input to be transmitted, for an individual one of the plurality of arrival patterns generated;
- calculating a control input set by calculating a plurality of control inputs corresponding respectively to the plurality of states predicted; and
- determining a control input to be outputted to the control target based on a result of statistical processing applied on the control input set calculated.

According to a third aspect of the present invention or disclosure, there is provided a program causing a computer to perform processing including:
- measuring a communication delay in a communication network based on a transmission time of a control input and a reception time of a state transmitted from a control target;
- generating a probability distribution of the communication delay in the communication network based on a history of the communication delay measured;
- generating, based on the probability distribution of the communication delay, a plurality of arrival patterns, an individual one thereof including, as an element, an arrival time of a control input already transmitted or to be transmitted at the control target;
- predicting a state of the control target at a time of arrival of the control input to be transmitted, for an individual one of the plurality of arrival patterns generated;
- calculating a control input set by calculating a plurality of control inputs corresponding respectively to the plurality of states predicted; and
- determining a control input to be outputted to the control target based on a result of statistical processing applied on the control input set calculated.

The above-mentioned program can be recorded in a computer-readable storage medium. The storage medium may be a non-transient medium such as a semiconductor memory, a hard disk, a magnetic recording medium, or an optical recording medium. The present invention can be embodied as a computer program product.

According to an individual aspect of the present invention, there are provided a remote control apparatus, a method for remote control, and a program that contributes to improving the stability of remote control over communication networks providing delay/jitter.

DETAILED DESCRIPTION

First, an outline of an example embodiment will be described. In the following outline, various components are attached with reference signs for the sake of convenience. Namely, the following reference signs are merely used as examples to facilitate understanding of the outline. Thus, the disclosure of the outline is not intended to limit thereto. In addition, connecting lines between blocks in each figure include both bidirectional and unidirectional. One-way arrow schematically shows a flow of a main signal (data) and does not exclude bidirectionality. Also, in a circuit diagram, a block diagram, an internal configuration diagram, a connection diagram, etc., there are an input port and an output port at input end and output end of connection line respectively, although not explicitly disclosed. The same applies for an I/O interface.

Figure 1:
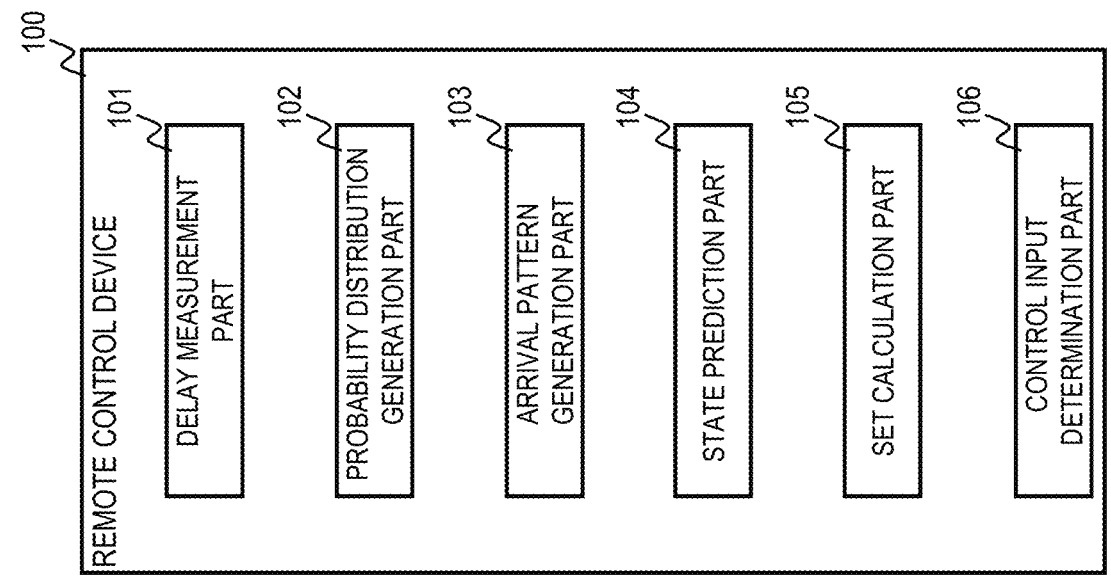
FIG. 1 is a diagram illustrating an outline of an example embodiment.

A remote control apparatus 100 according to an example embodiment includes a delay measurement part 101, a probability distribution generation part 102, an arrival pattern generation part 103, a state prediction part 104, a set calculation part 105, and a control input determination part 106 (see FIG. 1). The delay measurement part 101 measures a communication delay in a communication network based on a transmission time of a control input and a reception time of a state transmitted from a control target. The probability distribution generation part 102 generates a probability distribution of the communication delay in the communication network based on a history of the communication delay measured. The arrival pattern generation part 103 generates a plurality of arrival patterns, each including, as an element, a time of arrival of a control input already transmitted or to be transmitted at the control target, based on the probability distribution of the communication delay. The state prediction part 104 predicts a state of the control target at a time of arrival of the control input to be transmitted for each of the generated arrival patterns. The set calculation part 105 calculates a control input set by calculating a plurality of the control inputs corresponding to each of the predicted plurality of states. The control input determination part 106 determines the control input to be outputted to the control target, based on a result of statistical processing applied on the control input set.

As described above, in remote control through a communication network, an occurrence of a communication delay and a jitter thereof in the communication channel becomes a problem. The remote control apparatus 100 measures and stores a delay in the communication channel, based on a transmission time of the control input and a reception time of the corresponding response (state feedback from the control target). The remote control apparatus 100 calculates a probability distribution of the communication delay based on the stored delay information and perform modeling of the delay and its jitter in the communication channel. The remote control apparatus 100 fits a control input already transmitted or to be transmitted from the remote control apparatus to the modeled probability distribution of a delay in the communication path, and estimates a time of each control input arriving at the control target. The remote control apparatus 100 generates a plurality of arrival patterns, each of which includes, as an element (series), a time at of each control input arriving at the control target by repeating the estimation. Once a time when the control inputs arrive at the control target can be estimated, the remote control apparatus 100 can predict a state of the control target, with the control input already transmitted or to be transmitted reflected thereinto. By making such a prediction for each of the plurality of arrival patterns, the remote control apparatus 100 can comprehensively grasp an impact of a control input transmitted or to transmitted with various conditions of the communication channel (communication delay and jitter) reflected thereinto. The remote control apparatus 100 calculates a set including a plurality of control inputs by generating an appropriate control input (a control input with a predicted state fed back thereto) for each of states of a control target, grasped by a plurality of arrival patterns. The remote control apparatus 100 performs statistical processing on the calculated set and calculates a statistic (e.g., a standard deviation) indicating a characteristic of the set of control inputs as elements (e.g., a variance of the control inputs). Here, if a variance of the state (communication delay and jitter) in the communication channel is large, the control input included in the calculated set will also vary significantly. In contrast, if the variance of the state of the communication channel is small, the variance of the control input included in the calculated set is also small. As will be described in detail later, the remote control apparatus 100 determines the control input to be finally transmitted to the control target by focusing on a relationship between a state of the communication path and a control input. More specifically, when the remote control apparatus 100 determines, based on the calculated statistic (e.g., standard deviation) that the variance of the set including a plurality of control inputs is large, the remote control apparatus 100 determines the control input such that a range of change of the control input to prioritize a stability of the system. As a result, the stability of the remote control system via a communication network with a delay jitter can be improved. That is, the remote control apparatus 100 enables a state prediction control method that is robust to a delay jitter in a remote control system via a communication network.

Hereinafter, a specific example embodiment will be described in more detail with reference to the drawings. It is noted that in the example embodiments, the same components are designated by the same reference numerals, and the description thereof will be omitted.

First Example Embodiment

A first example embodiment will be described in more detail with reference to the drawings.

Figure 2:
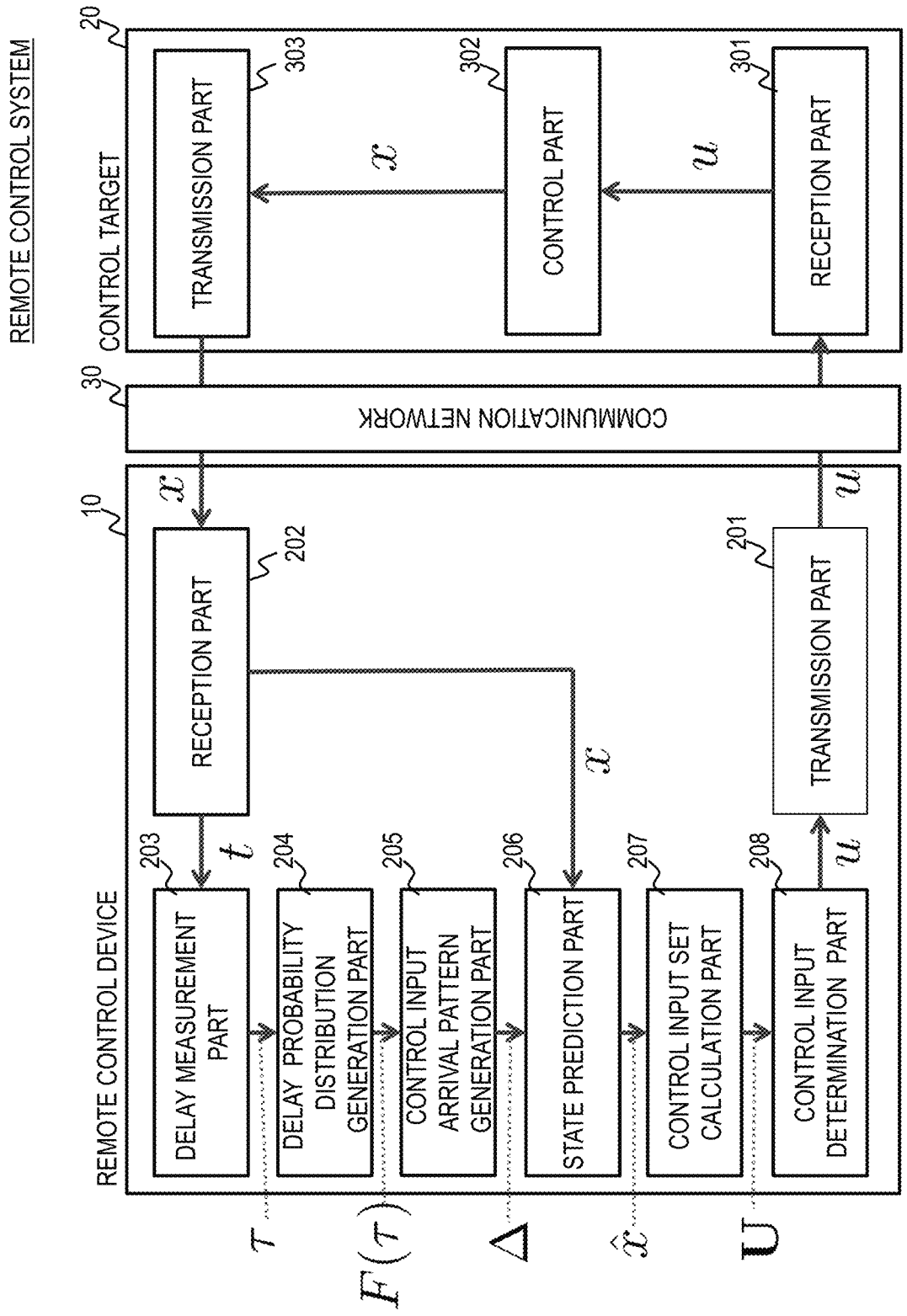
FIG. 2 is a diagram illustrating an example of a schematic configuration of a remote control system according to a first example embodiment.

FIG. 2 is a diagram illustrating an example of a schematic configuration of a remote control system according to a first example embodiment. Referring to FIG. 2, the remote control system includes a remote control apparatus 10, a control target 20, and a communication network 30.

First, the remote control system according to the first example embodiment will be described. The remote control system according to the first embodiment, is assumed to be a linear system including "dead time" represented by above described Equation 3 and Equation 4. Regarding to time, a continuous time system is assumed (time t can take a value in a range of real number). It is noted that the remote control apparatus 10, which is a controller, transmits control inputs ($u_0$, $u_1$, $u_2$, . . . ) to the control target every unit time (e.g., every 100 msec), as in time (t=0, 1, 2, . . . ).

Let the communication delay of each transmitted control input u be ($\tau_0$, $\tau_1$, $\tau_2$, . . . ), then a time at which each control input u arrives at the control target 20 is given as ($t_0 = 0 + \tau_0$, $t_1 = 1 + \tau_1$, $t_2 = 2 + \tau_2$, . . . ).

In the existing control system including a "dead time", a communication delay is constant, such that $\tau_0 = \tau_1 = \tau_2 = $ const (fixed value). In contrast, in the present application disclosure, the communication network is presupposed to have a delay jitter, and an interval between arrival time ($t_0$, $t_1$, $t_2$, . . . ) of each control input u to the control target 20 is unequal. It is noted that in the present application disclosure, it is assumed that the relationship between $t_0 \leq t_1 \leq t_2 \leq$ . . . is satisfied and there is no reversal of order in arrival of the control inputs u at the control target.

On reception of a control input $u_i$ (i=0, 1, 2, . . . ), the control target 20 receives immediately feeds back a state xi thereof at that time to the controller. That is, the remote control apparatus 10, which is a controller, discretely observes $x(t_i) = x_i$ and measures the communication delay $\tau_i$ upon reception of the feedback.

Let's assume that the time is t=T, and that only $x = x_0$ which is the most recent state of the control target, is observed (under observation) at a stage of trying to calculate a new control input (a control input to be transmitted) $u_T$. Let's assume that only $u_0$ is a control input u that has arrived at the control target 20, and the control inputs already transmitted ($u_1$, $u_2$, $u_{T-1}$) have not yet arrived at the control target 20. The remote control apparatus 10 according to the first example embodiment calculates, under such a circumstance, the control input $u_T$ to improve a stability of the remote control system.

Next, the processing of an individual apparatus included in the remote control system will be described.

First, a processing configuration (processing module) of the remote control apparatus 10 will be described.

As illustrated in FIG. 2, the remote control apparatus 10 includes a transmission part 201 and a reception part 202. Further, the remote control apparatus 10 includes a delay measurement part 203, a delay probability distribution generation part 204, a control input arrival pattern generation part 205, a state prediction part 206, a control input set calculation part 207, and a control input determination part 208.

The transmission part 201 and the reception part 202 communicate with the control target 20 via the communication network 30. More specifically, the transmission part 201 transmits a packet with a control input u stored therein to the control target 20. The reception part 202 receives a packet with a state x stored therein transmitted from the control target 20.

The delay measurement part 203 measures a communication delay in the communication network 30, based on a transmission time of the control input u and a reception time of the state x transmitted from the control target 20. More specifically, the delay measurement part 203 measures a communication delay, based on the state x received from the control target 20 and the control input u corresponding to the state x. For example, the delay measurement part 203 calculates the communication delay by subtracting the transmission time of the control input $u_i$ corresponding to the state $x_i$ from the reception time of the state $x_i$.

The delay probability distribution generation part 204 generates a probability distribution of the communication delay in the communication network 30, based on a history of the measured communication delay (a result of calculation of communication delay stored). As described above, the delay measurement part 203 measures the communication delay caused in the communication network 30, based on the feedback (state x) from the control target 20. The delay probability distribution generation part 204 constructs a cumulative distribution function $F(\tau)$ from the set of communication delays measured by the delay measurement part 203 {$\tau_i$|i=0, 1, 2, . . . }. The cumulative distribution function $F(\tau)$ is used as a probability distribution of the communication delay. Alternatively, the delay probability distribution generation part 204 may obtain a more precise probability distribution by a time series analysis or other probability analysis of the delay probability distribution.

Based on the probability distribution of the communication delay, the control input arrival pattern generation part 205 generates a plurality of sets, each including, as an element of the set, a time at which a control input u already transmitted or to be transmitted arrives at the control target 20. More specifically, the control input arrival pattern generation part 205 generates samples ($t_0$, $t_1$, . . . $t_T$) of a series of arrival times of the control input ($u_0, u_1, \ldots, u_T$) based on the calculated probability distribution of the communication delay. Hereinafter, the above samples related to the arrival time will be referred to as "arrival patterns".

For example, the control input arrival pattern generation part 205 generates the above arrival pattern by simulation (Monte Carlo simulation) of the arrival of the control input u using a D/G/1 queueing model. "D/G/1" is a notation of a queue, called Kendall's symbol, where a leading "D" represents a arrival process, following "G" represents a service time distribution, and "1" represents the number of service channels.

The arrival process D is deterministic, which means equally spaced transmission of control inputs u, as already assumed. The service time distribution G is general and uses the probability distribution $F(\tau)$ previously obtained. When arrival of control inputs ($u_0, u_1, \ldots, u_T$) is simulated in this D/G/1 queueing model, a single arrival pattern is generated.

It is noted that the control input arrival pattern generation part 205 customizes the simulation of the queue model differently from a normal queue with respect to a lapse of a service time. In the normal queue model, when a service at a head of the queue is completed, a service time is assigned to a next queue. In contrast, in the simulation by the control input arrival pattern generation part 205, it is assumed that a service time is assigned at a stage of arriving at the queue and the service time lapses. This customization reproduces a bursty arrival of control inputs after a spike-like communication delay.

The control input arrival pattern generation part 205 generates a plurality of arrival patterns by repeatedly executing the simulation. That is, when one of the arrival patterns is set to $$\Delta_i = \{t_0^{(i)}, t_1^{(i)}, \ldots, t_T^{(i)}\}$$

the set thereof $$D = \{\Delta_i | i=1, 2, \ldots\}$$

is obtained.

Here, to clarify that the function $u_u(t)$ of the control input in the communication environment with the previously defined delay jitter is a function of the control input with respect to a certain arrival pattern $\Delta_i$, the function is denoted as $u_u(t; \Delta_i)$. Using this notation, the generation of the arrival pattern by the control input arrival pattern generation part 205 is equivalent to generation of the function $u_u(t; \Delta_i)$ of the corresponding control input.

When the function $u_u(t; \Delta_i)$ of the control input corresponding to the arrival pattern of the generated control input is obtained, a state of the control target 20 is also changed by the control input.

The state predicting part 206 predicts, for each of the plurality of generated arrival patterns, a state (state change) of the control target 20 at the arrival time of the control input to be transmitted. More specifically, the state predicting part 206 calculates the predicted value $\hat{x}(t_T; \Delta_i)$ of the state $x(t_T)$ of the control target 20 at the time $t=t_T$ ($t_T$ is an expected arrival time of the control input $u_T$) using the following Equation. 8.

$$\hat{x}(t_T; \Delta_i) = e^{A(t_T - t_0)} x_0 + \int_{t_0}^{t_T} e^{A(t_T - s)} B u_u(s; \Delta_i) ds \quad \text{[Equation. 8]}$$

The control input set calculation part 207 calculates a set of control inputs by calculating a plurality of control inputs u, corresponding to each of a plurality of predicted states. As described above, generating a large number of arrival patterns $\Delta_i$ (i=1, 2, ...) yields the predicted values $\hat{x}(t_T; \Delta_i)$ of the same number of control inputs (i=1, 2, ...). Now consider executing state feedback control $u_{T,\Delta i} = K\hat{x}(t_T; \Delta_i)$ using the control input u (where K is the feedback gain), for individual ones of these predictions $\hat{x}(t_T; \Delta_i)$.

In this case, candidates of the control inputs $u_{T,\Delta i}$ are obtained for the number of arrival patterns (where, i=1, 2, ...). The control input set calculation part 207, by regarding the above candidates of the control inputs as a set of control inputs as in the following Equation.9, calculates the set.

$$U_T = \{K\hat{x}(t_T; \Delta_i) | \Delta_i \in D\} \quad \text{[Equation. 9]}$$

The control input determination part 208 determines a control input u to be outputted to the control target 20 based on a result of a statistical processing performed on the calculated control input set. More specifically, the control input determination part 208 determines a control input u to be outputted to the control target 20 based on a statistical value (e.g., a standard deviation) indicating a variance of an element included in the calculated control input set and a representative value (e.g., a median value) for the calculated control input set.

When a variance $\sigma^2(U_T)$ of the control input set u is large, the variance of the control inputs u due to a delay jitter is large. In such a case, as a matter of course, a deviation between a desired control input u, i.e., a state feedback $Kx(t_T)$ based on a true state $x(t_T)$ (hereinafter referred to as true state feedback), will also be large. If a value that is significantly different from a true state feedback is adopted in a control input u, the control system is highly likely to become unstable. In such a case, a risk of a large deviation from a stability point (equilibrium point) can rather be reduced by suppressing a magnitude (absolute value) of the control input u. Furthermore, by keeping the magnitude of the control input u small, even if a state of the system deviates from a true state feedback, it is more likely that the deviation (variance) can be kept within a recoverable range.

On the other hand, when the variance $\sigma^2(U_T)$ of the set of control inputs u is small, there is no need to suppress the magnitude of the control input u (there is little need to reduce the magnitude of the control input u), because it means that a deviation (gap) between a desired control input u and a true state feedback is small. That is, when the variance $\sigma^2(U_T)$ of the set $U_T$ of control inputs u is small, a stability of the control system is ensured even if a representative value (e.g., median, mean, and mode) of the set $U_T$ of control inputs u is inputted to the control target 20.

Based on the above knowledge, the control input determination part 208 calculates a final control input $u_T$ from the set of control inputs $U_T$, based on the following Equations 10 to 11.

$$S(U_T) = \left(1 + \frac{\alpha \sigma(U_T)}{|E(U_T)| + \varepsilon}\right)^{-1} \quad \text{[Equation 10]}$$

$$\overline{S}(U_T) = \gamma \overline{S}(U_{T-1}) + (1-\gamma) S(U_T) \quad \text{[Equation 11]}$$

$$u_T = M(U_T) \overline{S}(U_T) \quad \text{[Equation 12]}$$

where, $S(U_T)$ in Equation 10 is a correction term to suppress the control input u. A value range of $S(U_T)$ is $0 \leq S(U_T) \leq 1$. The correction term, as described above, becomes smaller ($S(U_T) \to 0$) as the variance $\sigma^2(U_T)$ becomes larger. Vice versa, the smaller the variance $\sigma^2(U_T)$, the larger the correction term ($S(U_T) \to 1$).

In Equation 10, $\sigma(U_T)$ is divided by $|E(U_T)|$ for normalization, which has a meaning similar to a coefficient of variance (standard deviation/mean). It is noted that in order to avoid the correction term $S(U_T)$ rapidly approaching 0 (to avoid division by zero), when $|E(U_T)|$ is close to 0, a positive number e is added to $|E(U_T)|$ in Equation 10. α in Equation 10 is an adjustment parameter.

Equation 11 is an exponential smoothing process to reduce a variance of the correction term $S(U_T)$ itself. γ in Equation 11 is a smoothing factor with a value range of 0<γ<1.

The control input determination part 208 sets a result of the calculation by Equation 12, as a final control input. More specifically, the control input determination part 208 multiplies a median value M ($U_T$) as a representative value of the set $U_T$ by the smoothed correction term $\overline{S}(U_T)$ to set a result as the final control input $u_T$.

Thus, the control input determination part 208 determines the control input u using a function proportional to a representative value (e.g., $M(U_T)$) of the control input set (e.g., $M(U_T)$) and monotonically decreasing (e.g., a correction term $S(U_T)$) with respect to a statistic (e.g., a standard deviation a) indicating a variance of the set. More specifically, the control input determination part 208 calculates a correction term $S(U_T)$, which takes a larger value when the statistic value indicating a variance of the set is small, while takes a smaller value when the statistic value indicating the variance of the set is large. Subsequently, the control input determination part 208 determines the final control input u by multiplying the calculated correction term $S(U_T)$ by a representative value of the control input set.

Next, an operational configuration of the control target 20 will be described. Referring to FIG. 2, the control target 20 includes a reception part 301, a control part 302, and a transmission part 303.

The reception part 301 receives the control input u transmitted by the remote control apparatus 10. The reception part 301 delivers the received control input u to the control part 302. The control part 302 controls a driving source (e.g., a motor or the like; not shown in FIG. 2) based on the acquired control input u. The control result by the control part 302 is transmitted to the remote control apparatus 10 via the transmission part 303 as state x.

Next, a hardware configuration of an individual apparatus will be described.

[Hardware Configuration]

Figure 3:
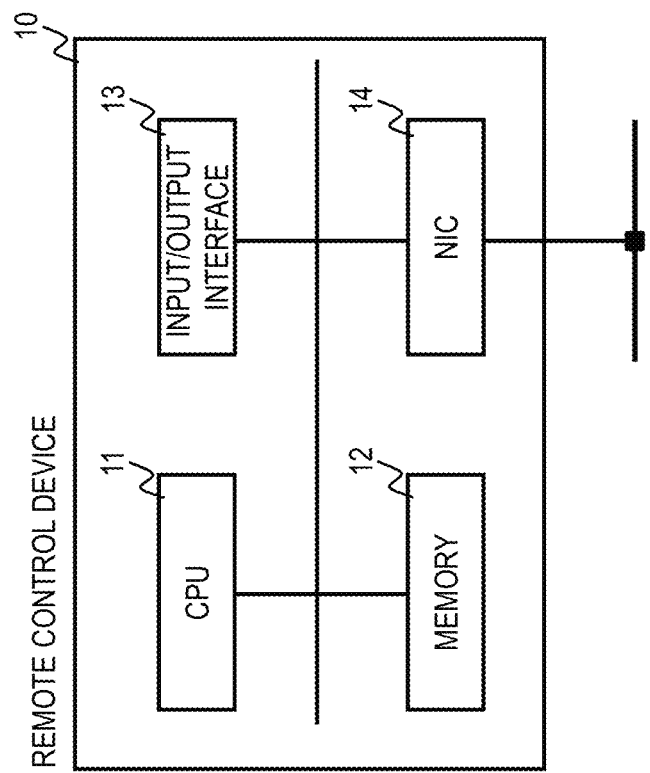
FIG. 3 is a diagram illustrating an example of a hardware configuration of the remote control apparatus according to the first example embodiment.

FIG. 3 is a diagram illustrating an example of a hardware configuration of the remote control apparatus 10. The remote control apparatus 10 has a configuration illustrated in FIG. 3. For example, the remote control apparatus 10 has a CPU (Central Processing Unit) 11, a memory 12, an input/output interface 13, a network interface (NIC) 14, and so forth, which are interconnected by an internal bus.

Note that the configuration in FIG. 3 is not for limiting a hardware configuration of the remote control apparatus 10. The remote control apparatus 10 may, as a matter of course, include hardware not shown. Alternatively, the number of CPUs included in the remote control apparatus 10 is not limited to the example in FIG. 3. That is, for example, a plurality of CPUs may be included in the remote control apparatus 10.

Memory 12 may be a RAM (Random Access Memory), a ROM (Read Only Memory), an auxiliary storage apparatus (a hard disk drive, etc.), or the like.

The input/output interface 13 is an interface with an input/output apparatus not illustrated. The input/output apparatus includes, for example, a display apparatus, an operation device, etc. The display apparatus is, for example, a liquid crystal display or the like. The operation apparatus is a keyboard, a mouse, etc., for example.

A function of the remote control apparatus 10 may be implemented by the above-mentioned processing module. The processing module can be implemented, for example, by the CPU 11 which executes a program stored in the memory 12. In addition, the above program can be downloaded via a network, or updated using a storage medium that stores the program. Furthermore, the above processing module may be implemented by a semiconductor chip. That is, the functions performed by the above processing module can be implemented by hardware or software executable by utilizing some hardware.

Regarding hardware of the control target 20, a basic configuration, including a CPU, a memory, etc., may be the same as that of the remote control apparatus 10. Since it is evident to those skilled in the art about a drive source using a motor or the like, description thereof will be omitted.

Figure 4:
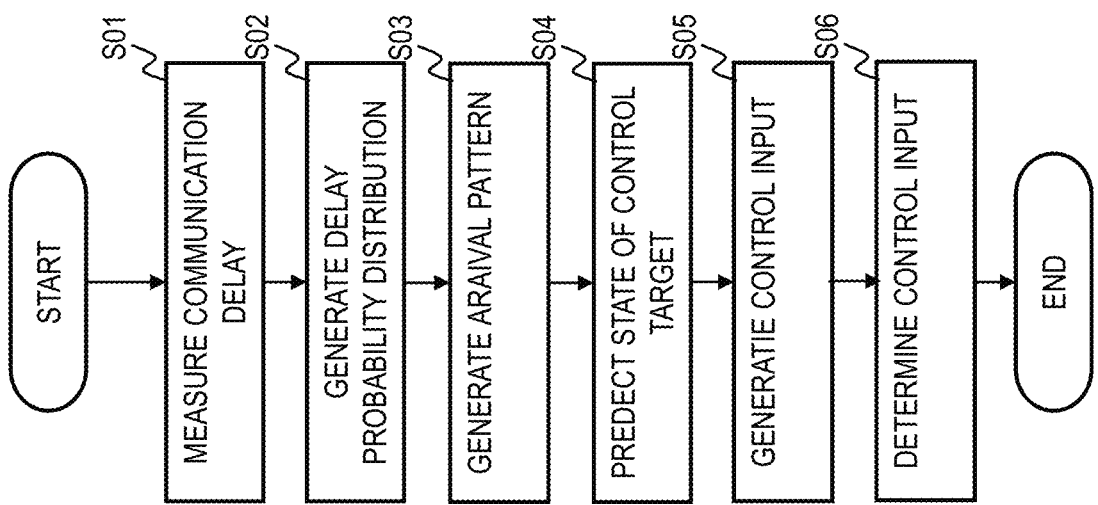
FIG. 4 is a flowchart illustrating an operation of the remote control apparatus according to the first example embodiment.

FIG. 4 is a flowchart illustrating an example of an operation of the remote control apparatus according to the first example embodiment.

The remote control apparatus 10 measures a communication delay based on a transmission time of a control input u already transmitted and a state x (feedback from the control target 20) corresponding to the control input u already transmitted (step S01).

The remote control apparatus 10 generates a probability distribution of the communication delay in the communication network 30 based on the measured communication delay (step S02).

The remote control apparatus 10 generates an arrival pattern regarding the control input u (step S03). More specifically, the remote control apparatus 10 uses the above-generated probability distribution to generate a sample (time series) about a presumed arrival time of the control input u. More specifically, the remote control apparatus 10 generates the arrival pattern above described by simulating an arrival of the control input u using a D/G/1 queueing model or the like. In doing so, the remote control apparatus 10 generates a number of arrival patterns (generating a set of arrival patterns) by repeating the above simulation.

The remote control apparatus 10 predicts a change in a state of the control target 20 by the control inputs u arriving at the control target 20 with an individual arrival pattern generated(step S04). As a result, the remote control apparatus 10 obtains prediction values about the control target 20 for the same number of elements included in the set of arrival patterns of the control input u.

The remote control apparatus 10 generates the control input u by using each predicted value obtained (step S05). That is, the remote control apparatus 10 generates a control input u with each predicted value fed back thereto. The remote control apparatus 10 generates the same number of control inputs u as the predicted values to generate a set of the control inputs u. The remote control apparatus 10 calculates the set of control inputs by calculating a plurality of control inputs with predicted states of the control target fed back thereto respectively, for individual ones of the predicted states.

The remote control apparatus 10 determines a control input to be transmitted to the control target 20 based on the set of control inputs u (step S06). More specifically, the remote control apparatus 10 calculates a standard deviation of the set $U_T$ of the control inputs u, and calculates the control input u to be transmitted to the control target 20 using the standard deviation. For example, the remote control apparatus 10 calculates a representative value (one of the mean, median, and mode) of the set $U_T$ of the control input u, and multiplies the representative value by a correction term reflecting a variance of the set $U_T$ to determine the final control input u.

The remote control apparatus 10 executes the operation illustrated in FIG. 4, each time a new control input $u_T$ is generated. That is, the remote control apparatus 10 calculates a probability distribution using communication delays accumulated (measured) over a predetermined period of time in the past, with a transmission time of the control input $u_T$, as a reference to grasp a state of the communication path when the control input $u_T$ is generated. By generating arrival patterns and predicting a state of the control target 20, using the probability distribution calculated, in this way, the remote control apparatus 10 calculates a set of control inputs u reflecting a state of the communication path at a time when the control inputs $u_T$ is generated. As a result, a control input u suited for a state of the communication path (delay, jitter) can be determined, and a remote control system robust to delay jitter can be realized.

The following describes simulation results (experimental results) of the remote control system according to the first example embodiment.

Here, the control method of the present application is evaluated by simulating a remote control system in which an inverted pendulum is set as a control target 20 and the inverted pendulum is controlled by a remote control apparatus 10.

Figure 5B:
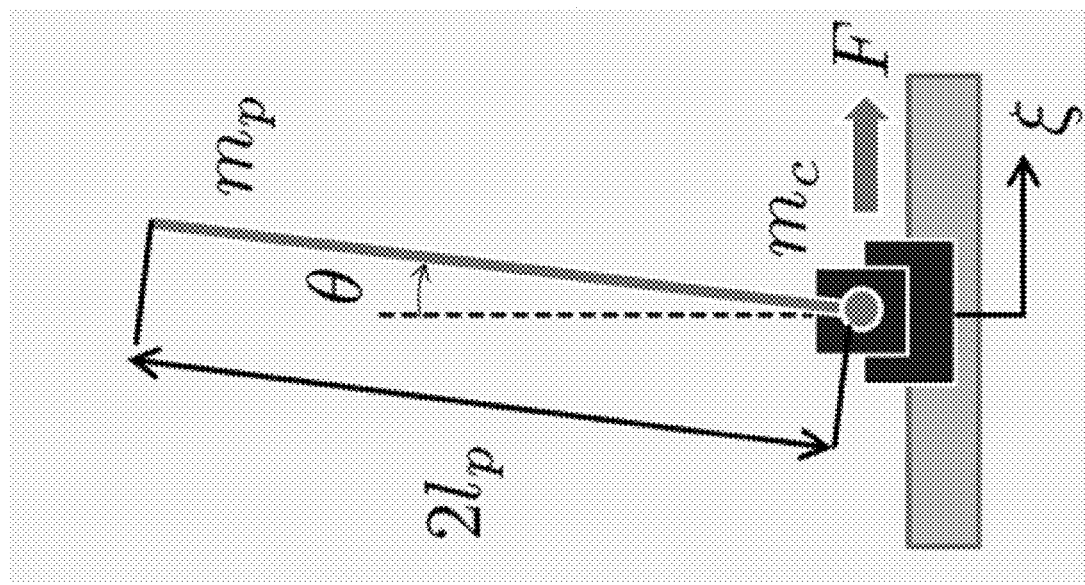
FIGS. 5A and 5B are diagrams illustrating a model of an inverted pendulum.
Figure 5A:
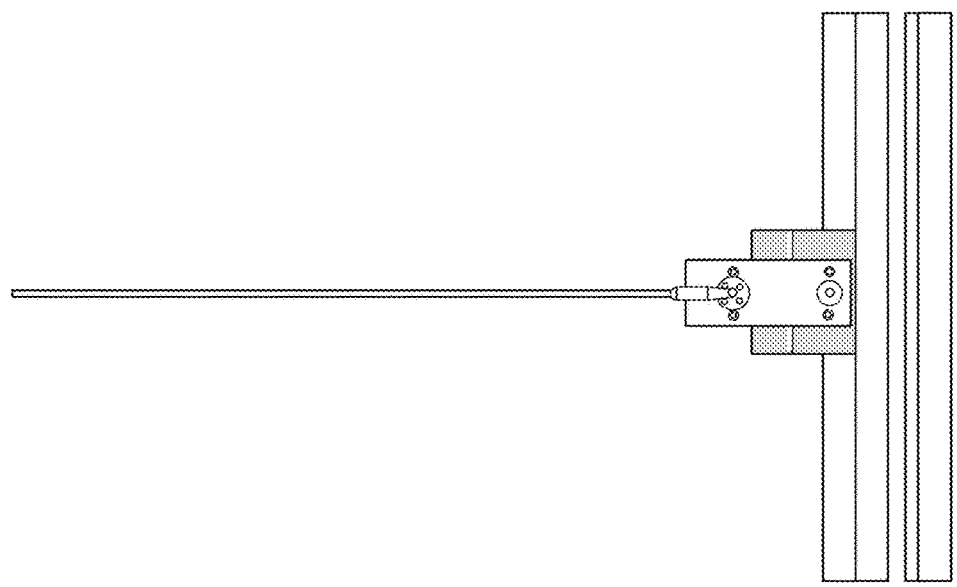

FIG. 5 is a diagram illustrating a model of an inverted pendulum. FIG. 5A shows an appearance of the control target used in the simulation, and FIG. 5B shows a modeling of the control target. In FIG. 5B, $m_c$ is a mass of a cart, $\zeta$ is a displacement of the cart, $21_p$ is a length of the pendulum, $m_p$ is a mass of the pendulum, and $\theta$ is an angle of the pendulum. When the cart is driven by a motor, a force F applied to the cart is determined by a voltage u applied to the motor, a torque constant $K_m$ of the motor, a resistance $R_m$ of the motor, and a gear radius $r_m$.

If the inverted pendulum model shown in FIG. 5 is represented by the previously described equation of state equation 3, a state vectors x and matrices A and B are given as the following Equation 13 to Equation 15, respectively.

$$x = [\xi\ \theta\ \dot{\xi}\ \dot{\theta}]^T \qquad \text{[Equation 13]}$$

$$A = \begin{bmatrix} 0 & 0 & 1 & 0 \\ 0 & 0 & 0 & 1 \\ 0 & \dfrac{m_p g}{m_c} & -\dfrac{K_m^2}{m_c r_m^2 R_m} & 0 \\ 0 & \dfrac{(m_c + m_p)g}{l_p m_c} & \dfrac{K_m^2}{l_p m_c r_m^2 R_m} & 0 \end{bmatrix} \qquad \text{[Equation 14]}$$

$$B = \begin{bmatrix} 0 \\ 0 \\ \dfrac{K_m}{m_c r_m R_m} \\ -\dfrac{K_m}{l_p m_c r_m R_m} \end{bmatrix} \qquad \text{Equation 15]}$$

Each parameter of the inverted pendulum system described above is as follows:
$m_c$=0.4 kg;
g=9.8 kg/s;
$K_m$=0.023 Nm/A;
$R_m$=8.3Ω; and
$R_m$=0.0065 m.

As for the weight and length of the pendulum, both light and heavy pendulums are prepared.

As for the weight and length of the light pendulum, the parameters are as follows:
$m_p$=0.20 kg; and
$l_p$=0.42 m.

As for the weight and length of the heavy pendulum, the parameters are as follows:
$m_p$=0.36 kg; and
$l_p$=0.82 m.

Simulations were performed using two pendulums with different weights as described above. A transmission interval of the control input u (voltage [V] applied to the motor) is set to be 16 msec and equally spaced.

The feedback gain K is determined by an optimal control law. For the light pendulum, K is set as follow:
K=[−11.180, −73.483, −15.733, −12.633]
while, set as follows, for the heavy pendulum.
K=[−11.180, −94.457, −17.256, −23.066]
Other setting parameters are as follows:
α=2.0;
ε=0.1; and
γ=0.95.

50 arrival patterns of the control inputs were generated. That is, the number of elements in the control inputs set $U_T$, was set to 50.

As described above, the arrival pattern for the control input u, reflecting the communication delay τ, is generated by the D/G/1 queueing model. The arrival process is an equally spaced arrival of 16 msec, which is the transmission interval of the control input u. As for a service time distribution, a gamma distribution in the following Equation 16 was adopted. The reason is that the gamma distribution is highly compatible with a distribution of a communication delay.

$$f(\tau) = \frac{(\tau - \tau_0)^{k-1} e^{-(\tau - \tau_0)/\beta}}{\Gamma(k)\beta^k} \qquad \text{[Equation 16]}$$

In Equation 16, $\tau_0$ is a minimum delay, k is a shape parameter, and β is a scale parameter. It is noted that unlike the normal queueing model as described above, a service time is given at a time of arrival of the control input u at the control target, and the service time begins to elapse at the same time.

In this simulation, with setting of $\tau_0$=10 msec and β=3.5, the scale parameter β was changed from β=15→1→25 every 10 seconds, and variance was given to the delay jitter itself, too.

Figure 6:
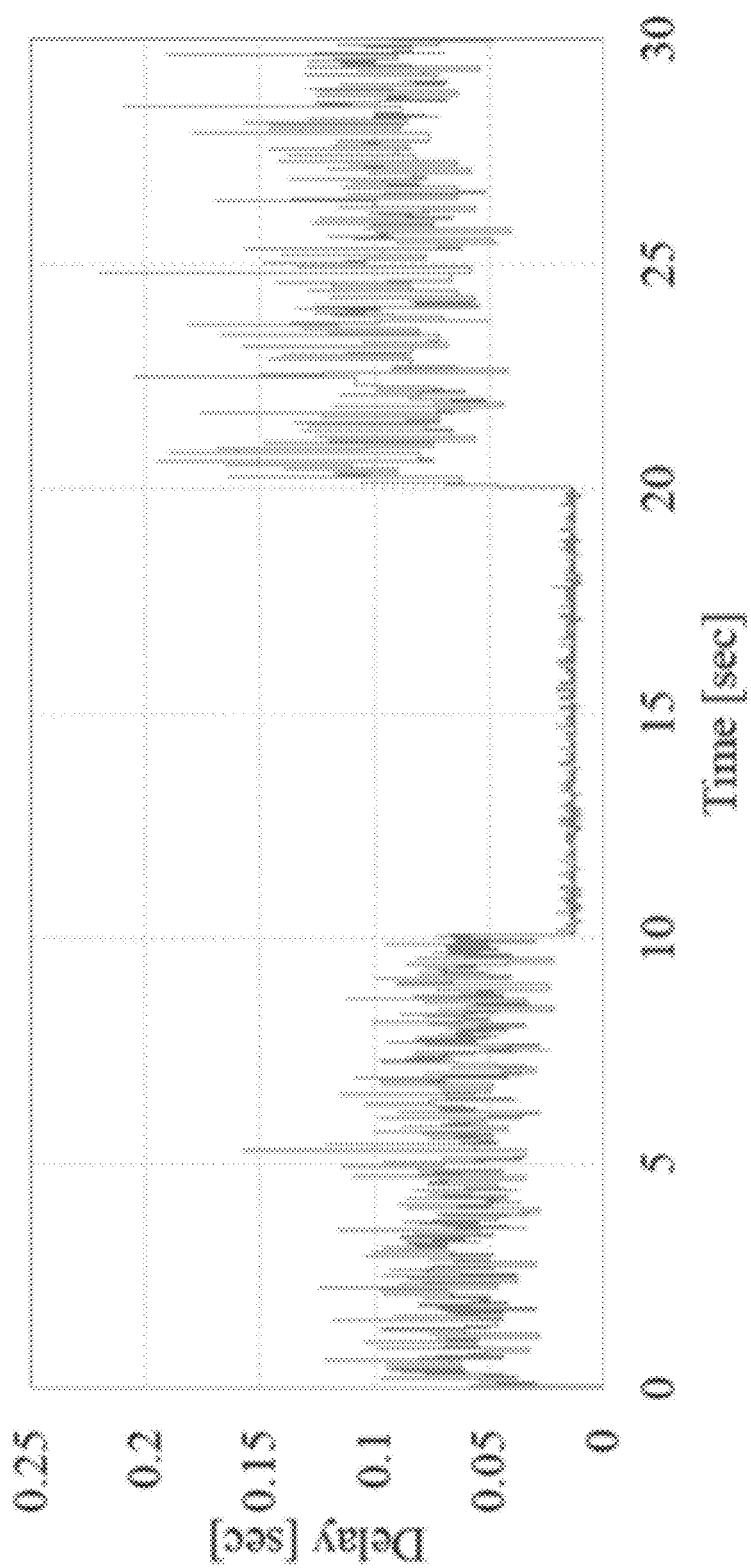
FIG. 6 is a diagram showing an example of a simulation result of a communication delay.

An example of the simulation of the communication delay under these conditions is shown in FIG. 6. The initial conditions of the pendulum and cart at a start of the simulation were set as follows:
ζ=−0.1 m;
ζ ((dot)=0.0 m/s;
θ=0.05 rad; and
θ (dot)=0.02 rad/s.

A simulation time was set to 30 seconds and an angular velocity of the pendulum was set every 4 seconds as an external disturbance to θ (dot)=−0.1 rad/s.

This external disturbance is assumed to be a case where the pendulum is slightly pushed.

If the pendulum could be kept inverted for 30 seconds, it is considered to be successful, and a probability of success was evaluated for 100 number of simulations. Furthermore, an $L_2$ norm of the pendulum angle θ at a time of successful inversion was calculated as an evaluation index of wobbling (wavering) of the pendulum.

Figure 7:
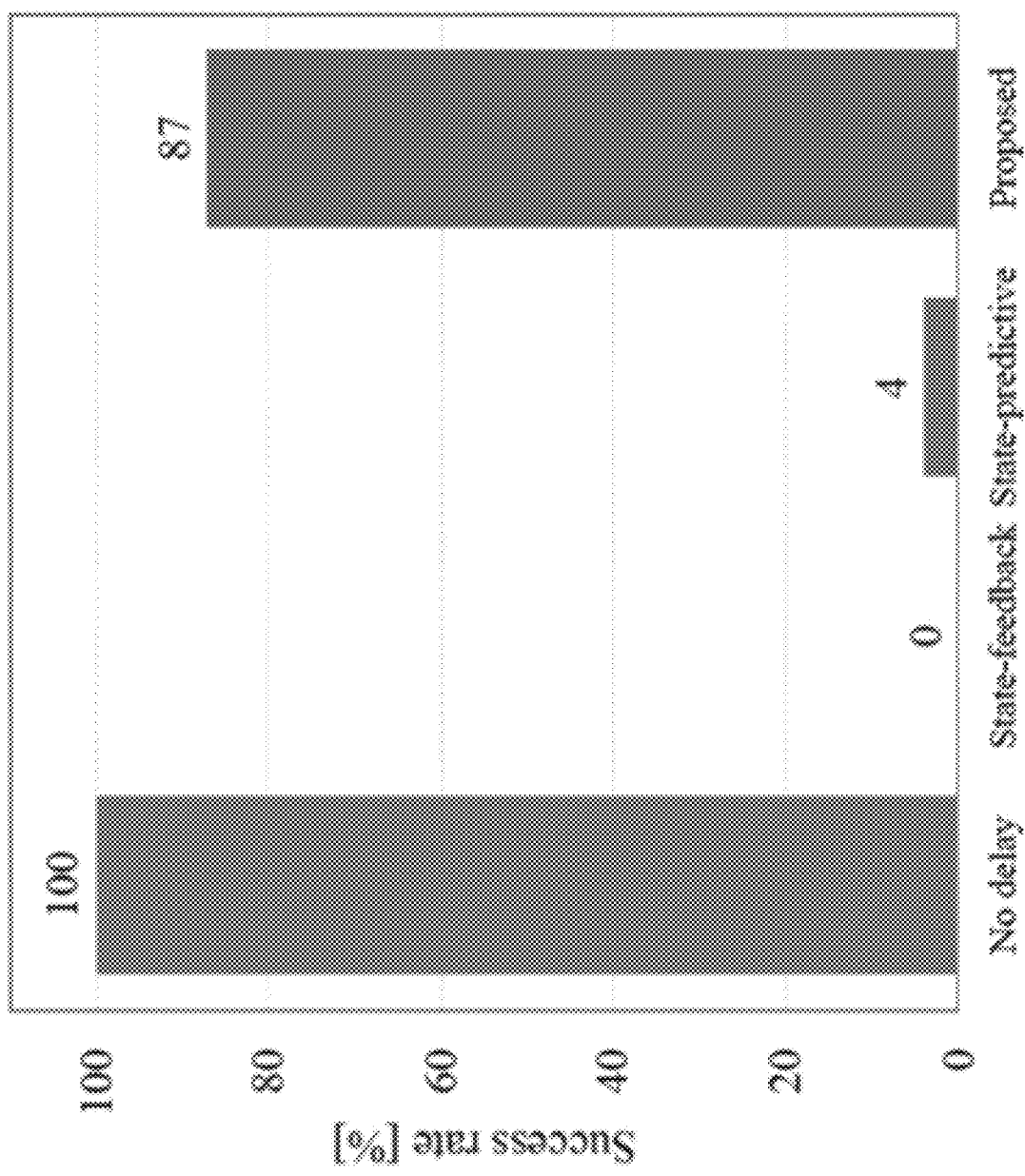
FIG. 7 is a diagram showing an example of the results of the inversion success rate when a light pendulum is used.

FIG. 7 is a diagram showing an example of a result of the inversion success rate when a light pendulum is used. In FIG. 7, from left to right, state feedback control with no communication delay (No delay), state feedback control without taking into consideration a communication delay (State-feedback), normal state predictive control (State-predictive), and the proposed technique of the present application disclosure (Proposed).

Referring to FIG. 7, the state feedback control, in case of no communication delay, has a success rate of 100%, but quickly becomes unstable in an environment with a communication delay and has not succeed in inversion even once in the present simulation. In addition, although the normal state prediction control is designed to operate in an environment with a delay, it is not robust to a delay jitter. The present simulation also exhibits this property, and the pendulum succeeds in inversion only four times with the normal state prediction control.

On the other hand, in the proposed technique of the present application disclosure, a magnitude of the control input u is adaptively compensated by taking into account a variance of the control input due to a delay jitter, and an inversion success rate is able to be raised to 87%.

Figure 8A:
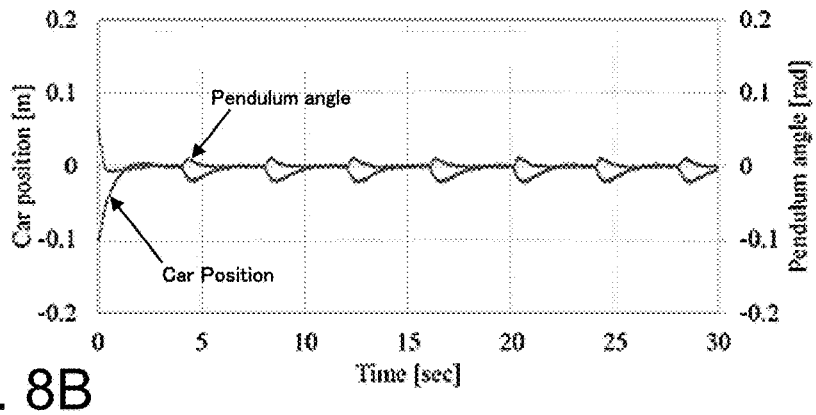
FIGS. 8A to 8D are diagrams showing an example(s) of control results by various control methods, including the present application disclosure.
Figure 8B:
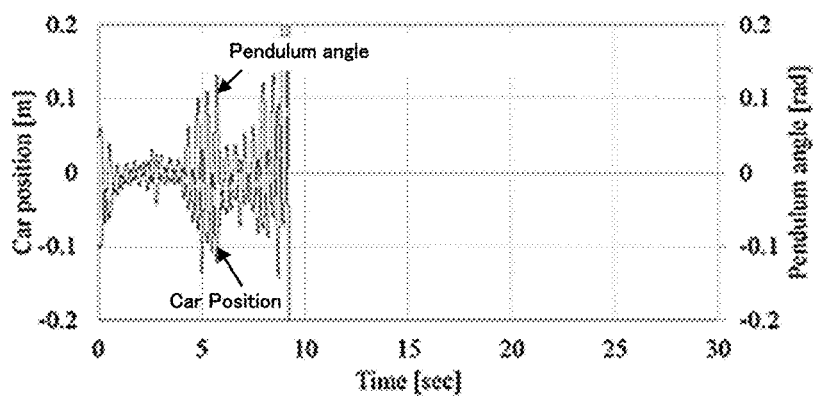
Figure 8C:
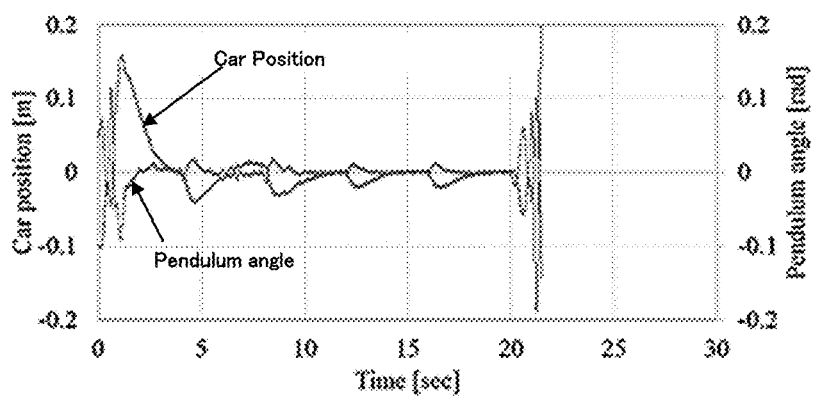
Figure 8D:
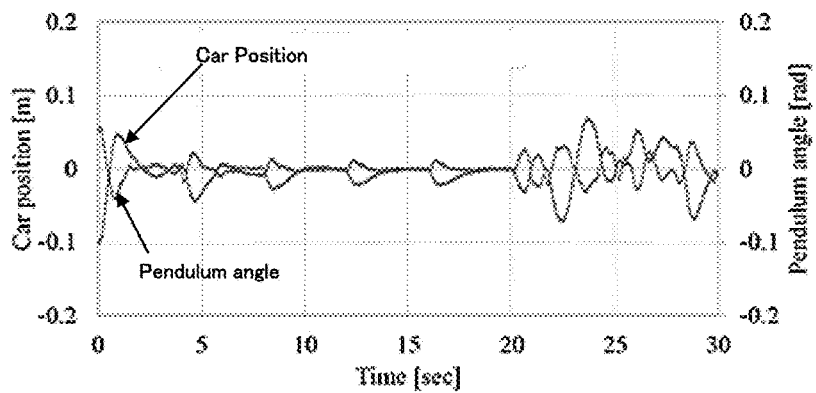

FIGS. 8A to 8D show an example of a control result from each control technique. In FIG. 8, a horizontal axis is time, a left vertical axis is a cart position ζ, and a right vertical axis is a pendulum angle θ. FIG. 8A shows a control result by the state feedback control with no delay. FIG. 8B shows a control result by the state feedback control with a delay. FIG. 8C shows a control result by the state prediction control with a delay. FIG. 8D shows a control result by the technique proposed by the present application disclosure with a delay. In each of FIGS. 8A to 8D, a variation occurring every 4 seconds is ascribable to a change in an angular velocity added as an external disturbance, as described above.

Referring to FIG. 8B, it can be seen that the state feedback becomes unstable as soon as the delay jitter is included. Also, referring to FIG. 8C, it can be seen that in the normal state prediction control, the pendulum can be inverted up to lapse of 20 seconds, while the pendulum becomes unstable when the delay jitter increases after 20 seconds.

On the other hand, in the proposed technique of the present application disclosure as shown in FIG. 8D, it can be seen that, although an oscillation is somewhat larger after 20 sec, the inversion of the pendulum can be achieved (maintained). In the proposed technique of the present application disclosure, robustness to a delayed jitter is enhanced by the correction term $\bar{S}$ ($U_T$), as shown in Equation 12.

Figure 9:
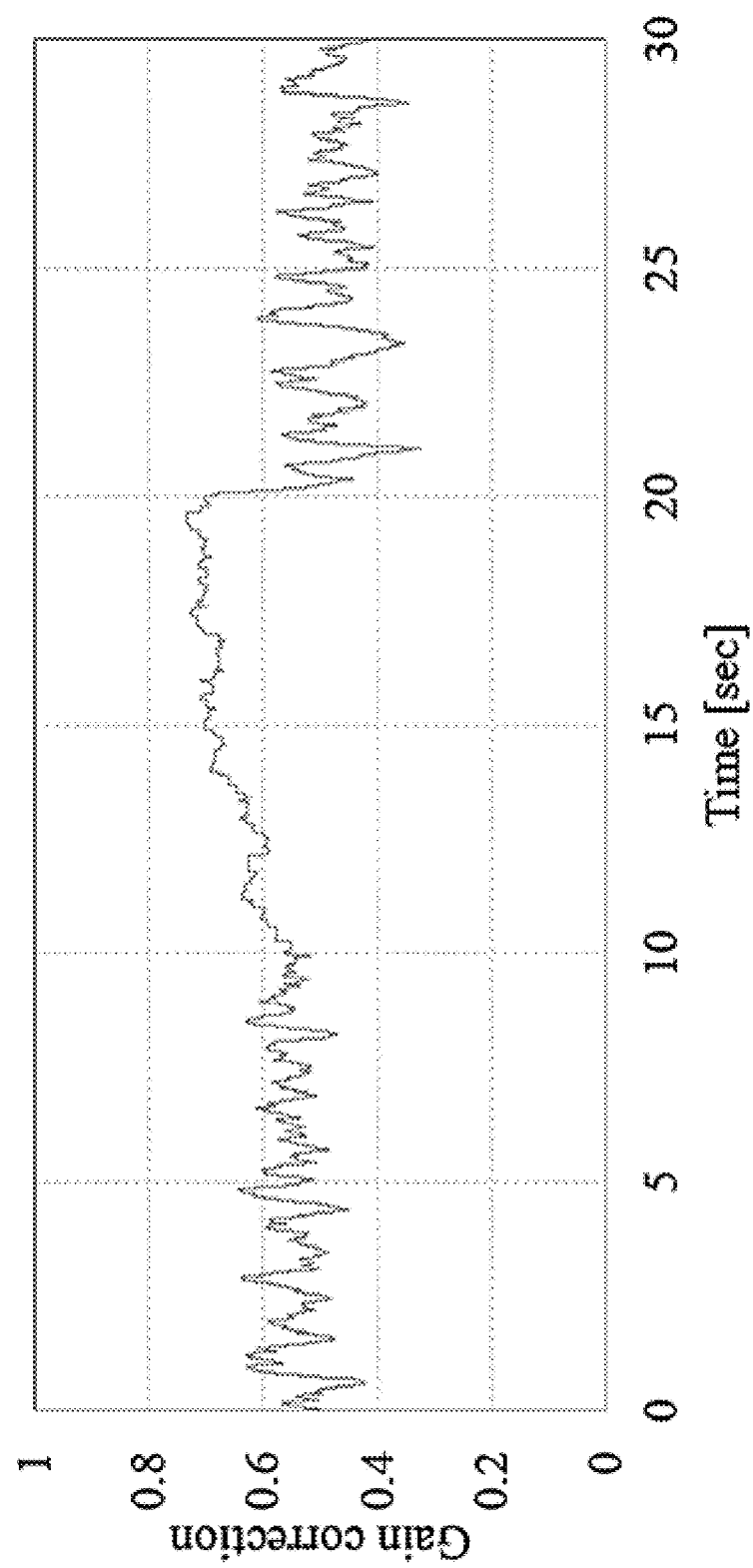
FIG. 9 is a diagram showing an example of a correction term for the proposed technique according to the present application disclosure.

In the simulation of the proposed technique shown in FIG. 8D, a value of the correction term $\bar{S}$ ($U_T$) is shown in FIG. 9. Referring to FIG. 9, it can be seen that, in general, a value of the correction term fluctuates between 0.4 and 0.8, but a value of the correction term increases between 10 and 20 seconds when the delay jitter is small, and the value of the correction term decreases after 20 seconds when the delay jitter is large. This indicates that fluctuation of the control input u is small when the delay jitter is small and a risk of being deviated from a true state feedback is low, while the opposite is true when the delay jitter is large.

Figure 10:
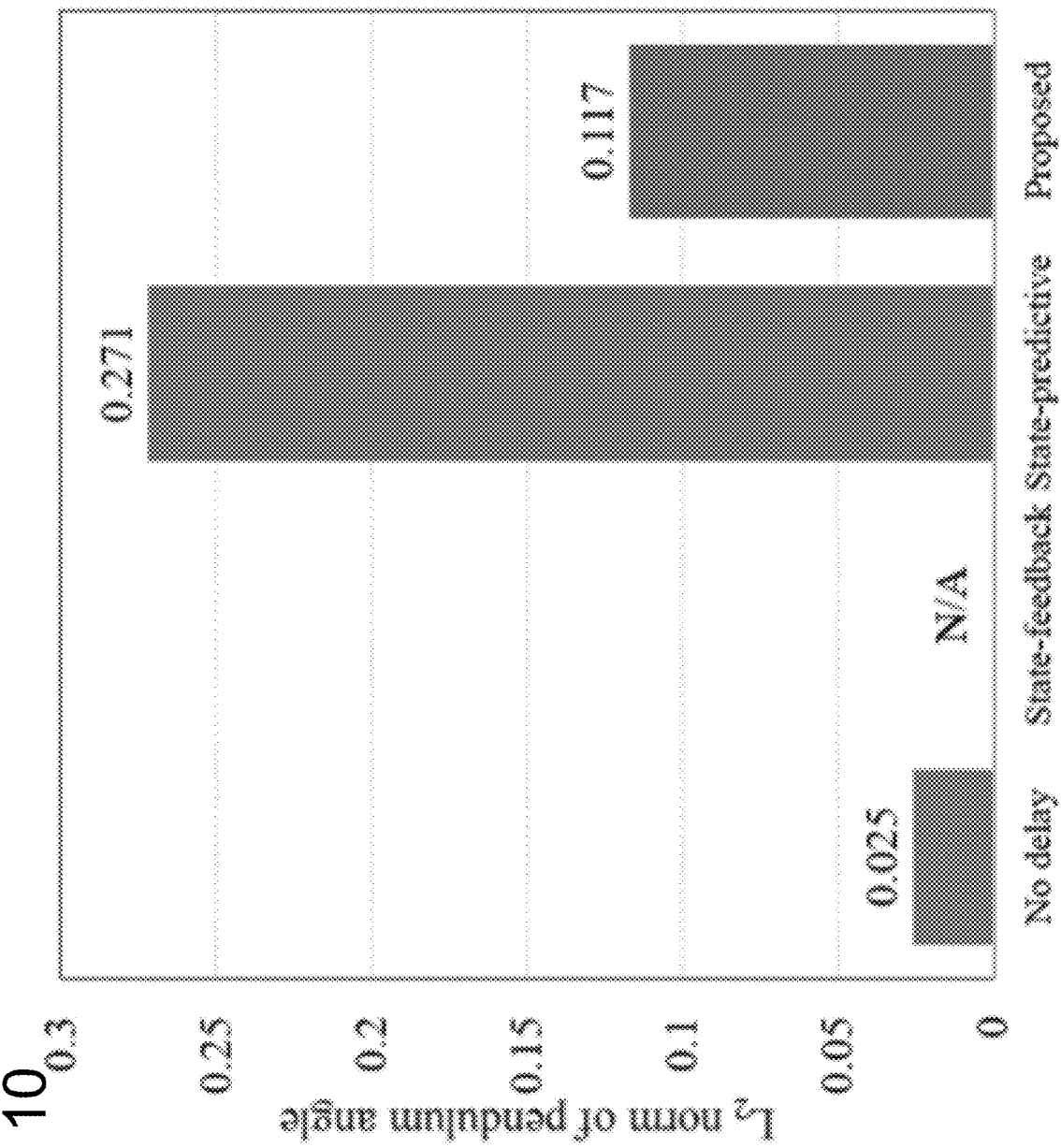
FIG. 10 is a diagram showing an average of $L_2$ norm of the pendulum angle at successful inversion for various control methods, including the present application disclosure.

FIG. 10 illustrates an average value of an $L_2$ norm of a pendulum angle θ in a case where the pendulum angle succeeds in inversion out of 100 trials for each technique. It is noted that for the state feedback that never succeeds in inversion, there is no average value.

Referring to FIG. 10, the $L_2$ norm of the pendulum angle θ in the proposed technique of the present application is reduced to less than half in comparison with the normal state prediction control technique. This fact indicates that the technique proposed by the present application disclosure is able to suppress a wavering of the pendulum better than the normal state prediction control, for cases of the pendulum similarly succeeding in inversion.

Figure 11:
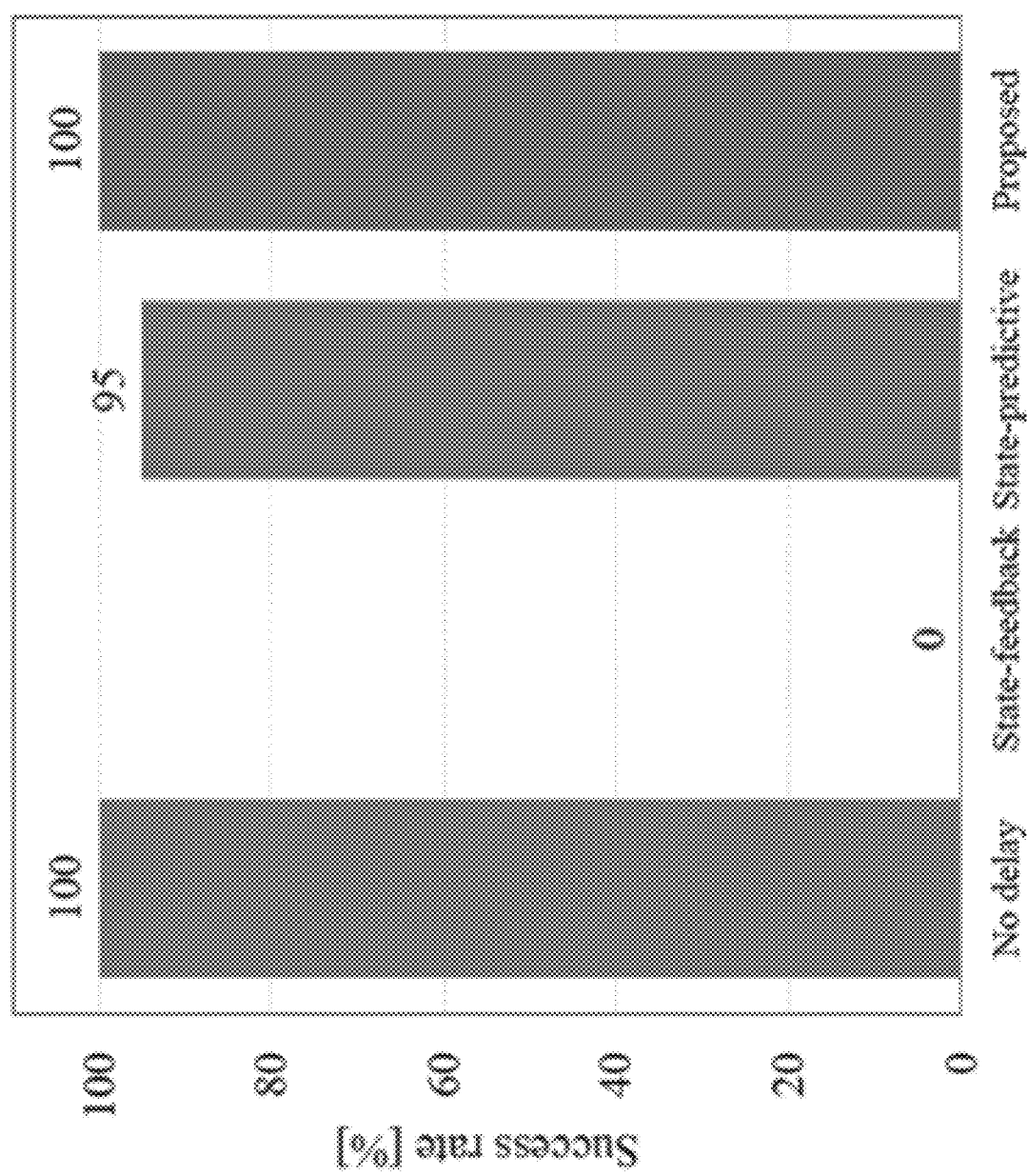
FIG. 11 is a diagram showing an example of an inverted success rate for a heavy pendulum.

FIG. 11 illustrates an example of the inversion success rate of a heavy pendulum. The state feedback control without prediction has not succeeded in inversion of the pendulum even with the heavy pendulum. The normal state prediction control has achieved a success rate of 95%.

The heavy pendulum has a larger moment of inertia and therefore a larger time constant. Therefore, in addition to being relatively less influenced by an effect of a delay, a deviation of a state prediction of the pendulum is also smaller, which is counted as a factor. Since the inversion control of a large pendulum has an advantage over that of a small pendulum, the proposed technique of the present application disclosure has achieved a success rate of 100% when using a heavy pendulum.

Figure 12A:
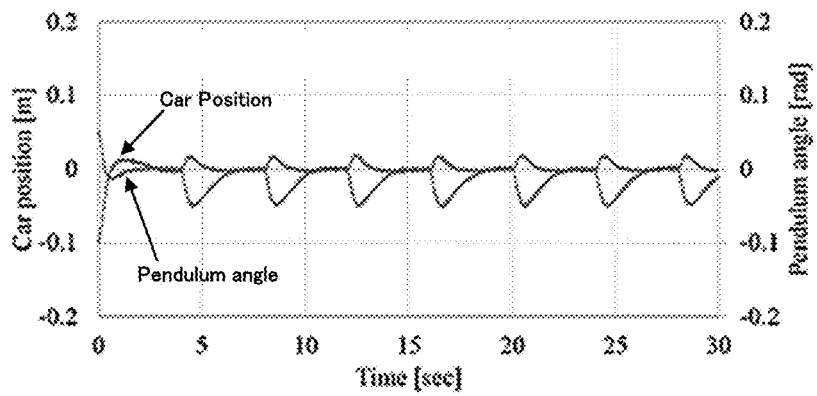
FIGS. 12A to 12D are diagrams showing an example(s) of control result of the heavy pendulum.
Figure 12B:
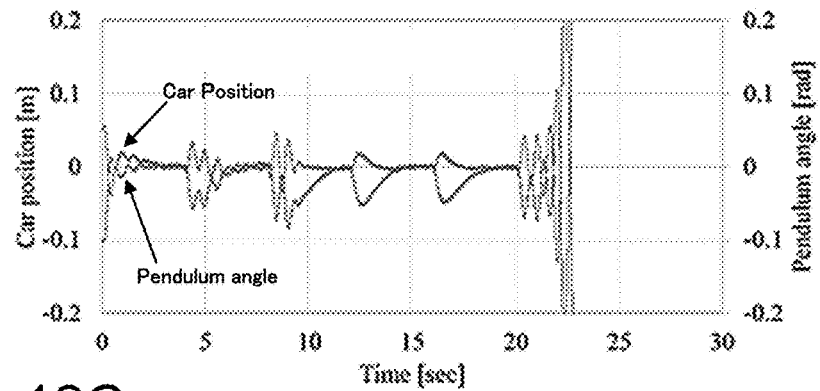
Figure 12C:
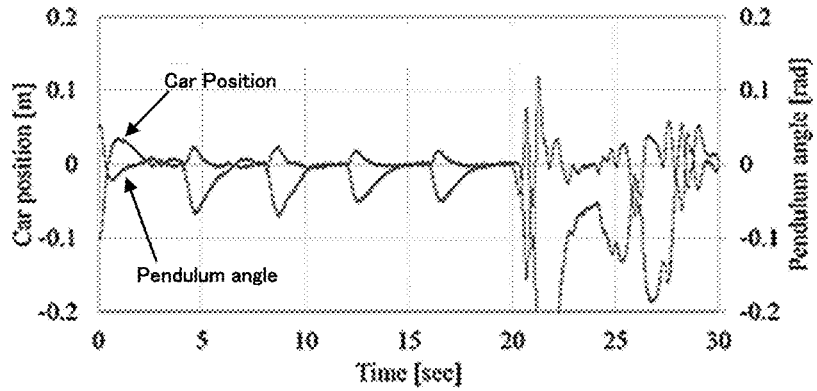
Figure 12D:
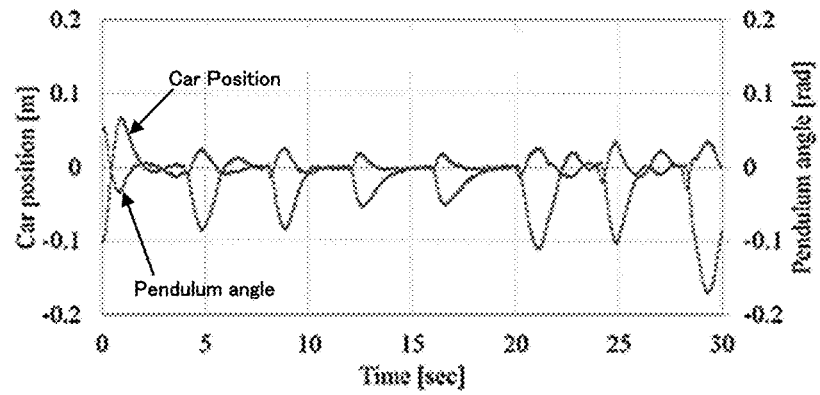

FIGS. 12A to 12D illustrate an example of a control result of a heavy pendulum. FIG. 12A shows a control result by the state feedback control with no delay. FIG. 12B shows a control result by the state feedback control with a delay. FIG. 12C shows a control result by the state prediction control with a delay. FIG. 12D shows a control result by the proposed technique of the present application disclosure with a delay.

As mentioned above, a time during when the pendulum is able to be inverted in the state feedback control and the normal state prediction control is elongated because of a large time constant and ease of control. On the other hand, since an inertia moment of the pendulum is large, a time required to recover (correct) an angular velocity against an external disturbance is longer.

Figure 13:
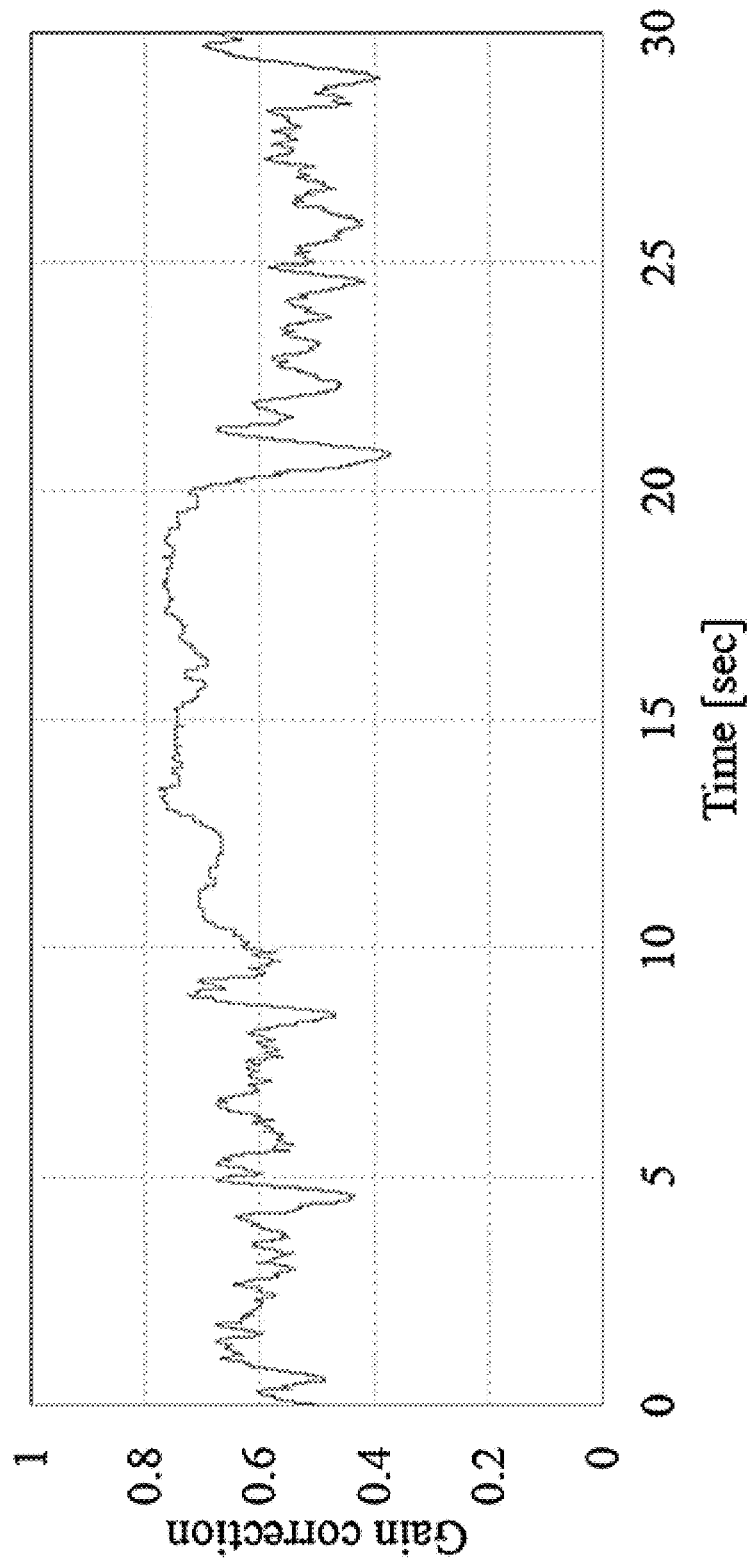
FIG. 13 is a diagram showing an example of a correction term for the proposed technique according to the present application disclosure.

FIG. 13 illustrates an example of a correction term $\bar{S}$ ($U_T$) of the proposed technique of the present application disclosure. Referring to FIGS. 9 and 13, no significant difference between heavy and light pendulums with respect to the correction term can be found.

Figure 14:
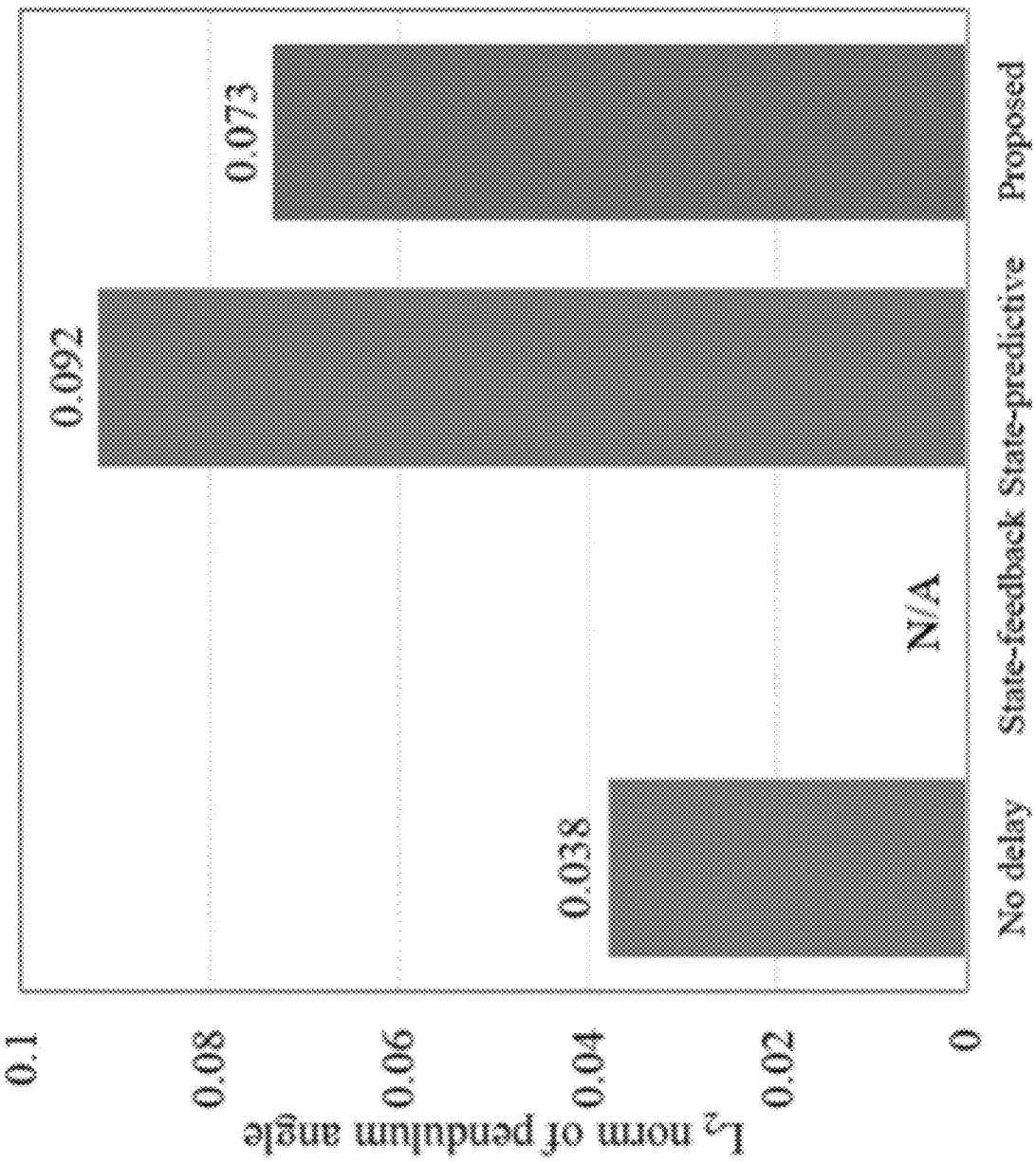
FIG. 14 is a diagram showing an example of the $L_2$ norm of the pendulum angle when the heavy pendulum is used.
Figure 15:
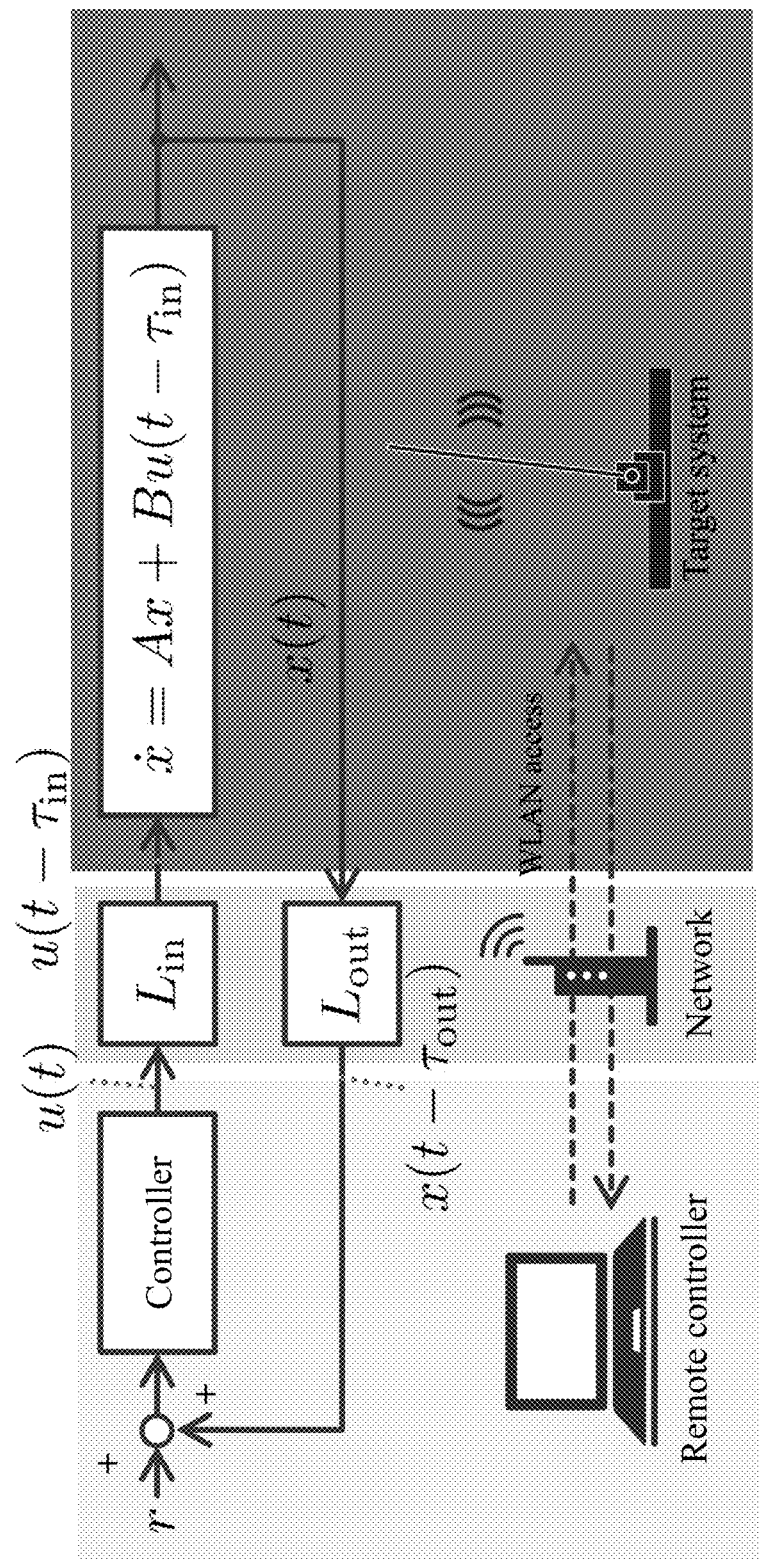
FIG. 15 is a diagram showing an example of a remote control system.
Figure 16:
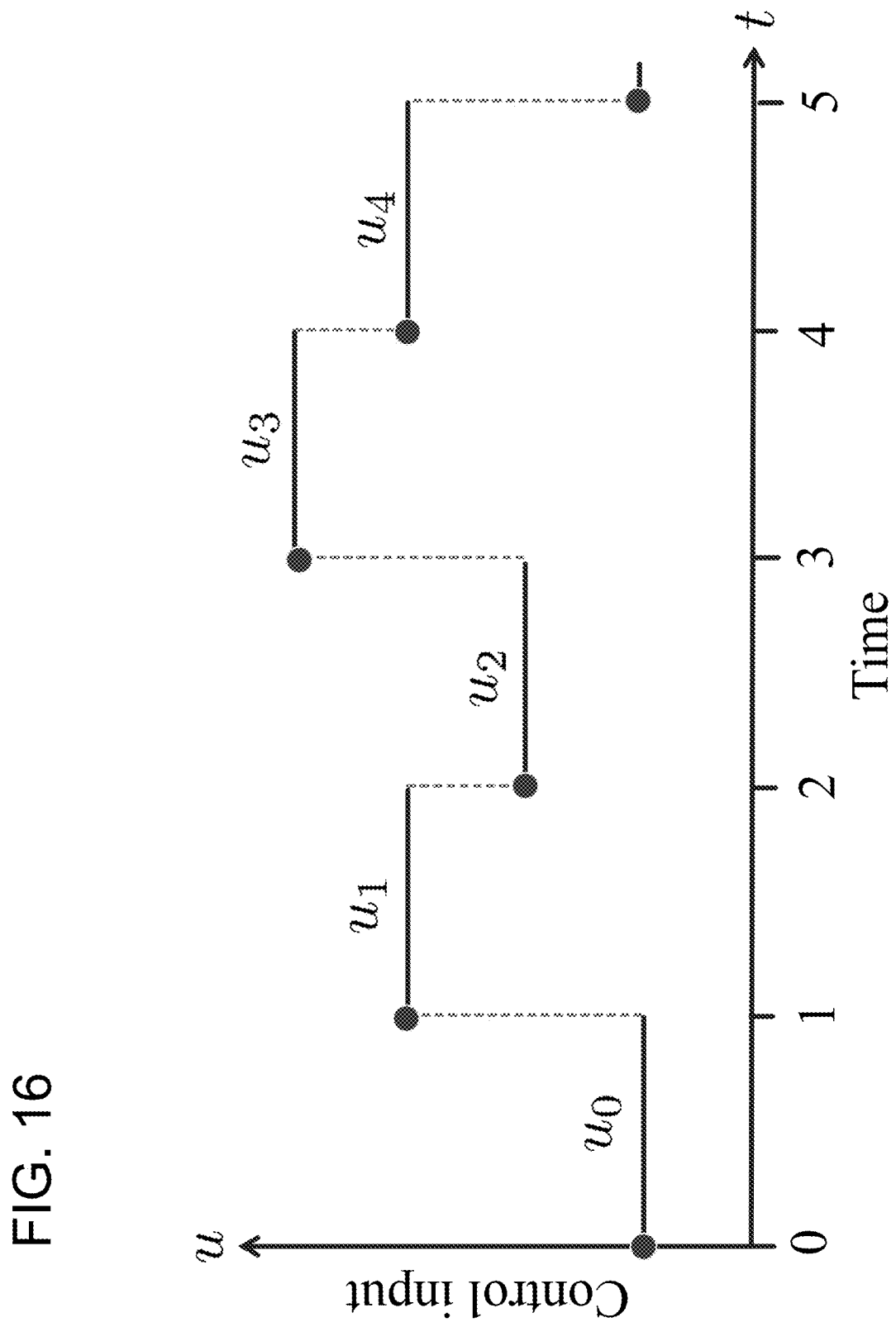
FIG. 16 is a diagram illustrating a remote control system.
Figure 17:
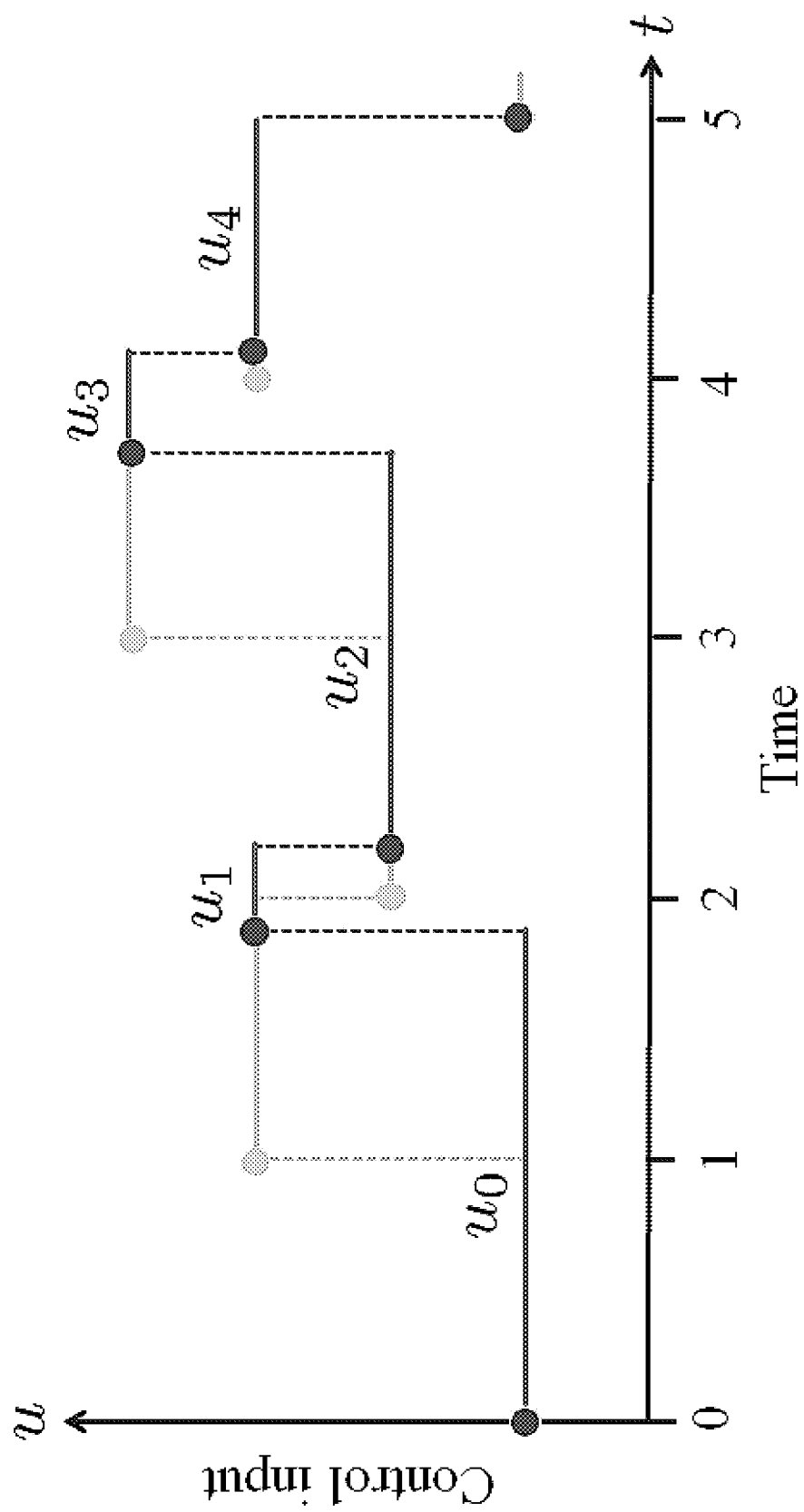
FIG. 17 is a diagram illustrating a remote control system.

FIG. 14 illustrates an example of an $L_2$ norm of a pendulum angle when a heavy pendulum is used. Referring to FIG. 14, it can be seen that, as mentioned above, the heavy pendulum is easier to control, so that a norm value, on the whole, tends to is smaller, for each control technique. Among them, it can be seen that the proposed technique of the present application disclosure is able to reduce the wobbling (tilting) of the pendulum more than the normal state prediction control.

As described above, the remote control apparatus 10 according to the first example embodiment generates a probability distribution of a communication delay, and uses the probability distribution to generate arrival patterns of the control inputs u already transmitted or to be transmitted. The remote control apparatus 10 generates a plurality of arrival patterns, predicts, for each arrival pattern, an impact of the control input u to be transmitted on the control target 20

(predicting a state of the control target 20), and generates a plurality of control inputs u suited for each prediction. When a "variance" of the generated control inputs u is large, the remote control apparatus 10 regards that it is difficult to accurately predict an impact of the control inputs u already transmitted or to be transmitted on the control target 20 (state feedback), thus keeping an amount of control to the control target 20 small. As a result, the remote control system is less likely to be unstable and the system is robust to a delay jitter.

The above example embodiments can partially or entirely be described as following Supplementary notes (Notes), though not limited thereto.

[Note 1]
The remote control apparatus is that according to the above described first aspect.

[Note 2]
The remote control apparatus according to note 1, wherein
the set calculation part is configured to calculate a control input set by calculating a plurality of the control inputs with the predicted state of the control target fed back thereinto for each of the plurality of predicted states.

[Note 3]
The remote control apparatus according to note 1 or 2, wherein the control input determination part is configured to determine the control input to be outputted to the control target based on the statistical value that indicates a variance of an element contained in the calculated control input set and a representative value of the calculated control input set.

[Note 4]
The remote control apparatus according to note 3, wherein the control input determination part is configured to determine the control input by using a function directly proportional to the representative value of the control input set and monotonically decreasing with respect to the statistical value that indicates the variance.

[Note 5]
The remote control apparatus according to note 3 or 4; wherein
the control input determination part is configured to determine the control input calculating a correction term which when the statistics indicating the variance is smaller, the value of the correction term is larger, whereas when the statistics indicating the variance is larger, the value of the correction term is smaller, and multiplying the calculated correction term by the representative value regarding the control input set.

[Note 6]
The remote control apparatus according to any one of notes 3 to 5, wherein the control input determination part is configured to calculate any one of an average value, a median and a mode, as the representative value regarding the control input set.

[Note 7]
The remote control apparatus according to any one of notes 1 to 6, wherein the arrival pattern generation part is configured to generate the arrival pattern by Monte Carlo simulation using Queuing model.

[Note 8]
The remote control apparatus according to note 7, wherein the arrival pattern generation part is configured to generate a plurality of the arrival patterns repeating the Monte Carlo simulations using Queuing model.

[Note 9]
The remote control apparatus according to note 7 or 8, wherein the arrival pattern generation part is configured to assign a service time at a stage of the control input arriving at the queue.

[Note 10]
The remote control apparatus according to any one of notes 7 to 9, wherein the Queuing model is D/G/1 Queuing model.

[Note 11]
The remote control method is that according to the above second aspect.

[Note 12]
The program according to the above described third aspect.

The modes of Notes 11 and 12 can be expanded to those of Notes 2 to 10 in the same way as a mode of Note 1.

Note that respective pieces of disclosure of the above cited PTLs, etc., are incorporated herein by reference thereto. Variations and adjustments of the example embodiments and examples are possible within the scope of the disclosure (including the claims) of the present invention and based on the basic technical concept of the present invention. Various combinations and selections of various disclosed elements (including elements in the claims, example embodiments, examples, drawings, etc.) are possible within the scope of the disclosure of the present invention. Namely, the present invention of course includes various variations and modifications that could be made by those skilled in the art according to the overall disclosure including the claims and the technical concept. Regarding a numerical value range(s) described in the present disclosure, it should be deemed that arbitrary numerical values or small ranges included in the ranges should be deemed to have been concretely disclosed even if there is no other description thereof.

The invention claimed is:

1. A remote control apparatus, comprising:
a processor, and
a memory in circuit communication with the processor, wherein
the processor is configured to execute program instruction stored in the memory to:
measure a communication delay in a communication network based on a transmission time of a control input and a reception time of a state transmitted from a control target;
generate a probability distribution of the communication delay in the communication network based on a history of the communication delay measured;
generate, based on the probability distribution of the communication delay, a plurality of arrival patterns, an individual pattern including, as an element thereof, a time of arrival of a control input already transmitted or to be transmitted at the control target;
predict a state of the control target at a time of arrival of the control input to be transmitted at the control target, for an individual one of the plurality of arrival patterns generated;
calculate a control input set by calculating a plurality of control inputs corresponding respectively to the plurality of states predicted; and
determine a control input to be outputted to the control target, based on a result of statistical processing applied on the control input set calculated.

2. The remote control apparatus according to claim 1, wherein the processor is configured to execute the program instruction stored in the memory to calculate, for an individual one of a plurality of the states predicted, the control input set by calculating a plurality of control inputs, an individual one of the plurality of control inputs having the predicted state of the control target fed back thereinto.

3. The remote control apparatus according to claim 1, wherein the processor is configured to execute the program instruction stored in the memory to determine the control input to be outputted to the control target, based on a statistical value indicating a variance of an element included in the control input set calculated and a representative value of the control input set calculated.

4. The remote control apparatus according to claim 3, wherein the processor is configured to execute the program instruction stored in the memory to determine the control input by using a function directly proportional to the representative value of the control input set and monotonically decreasing with the statistical value indicating the variance.

5. The remote control apparatus according to claim 3, wherein the processor is configured to execute the program instruction stored in the memory to determine the control input by calculating a correction term, a value of the correction term being large when the statistical value indicating the variance is small, while being small when the statistical value indicating the variance is large, and multiplying the correction term with the representative value of the control input set.

6. The remote control apparatus according to claim 3, wherein the processor is configured to execute the program instruction stored in the memory to calculate an average value, a median, or a mode, as the representative value of the control input set.

7. The remote control apparatus according to claim 1, wherein the processor is configured to execute the program instruction stored in the memory to generate the arrival pattern with a Monte Carlo simulation using a queuing model.

8. The remote control apparatus according to claim 7, wherein the processor is configured to execute the program instruction stored in the memory to generate a plurality of the arrival patterns by repeating the Monte Carlo simulation using a queuing model.

9. The remote control apparatus according to claim 7, wherein the processor is configured to execute the program instruction stored in the memory to assign a service time at a stage of the control input arriving at the queue.

10. The remote control apparatus according to claim 7, wherein the queuing model is D/G/1 queuing model.

11. A remote control method for a remote control apparatus controlling a control target via a communication network, the method comprising:
measuring a communication delay in the communication network based on a transmission time of a control input and a reception time of a state transmitted from the control target;
generating a probability distribution of the communication delay in the communication network based on a history of the communication delay measured;
generating, based on the probability distribution of the communication delay, a plurality of arrival patterns, an individual pattern including, as an element, an arrival time of a control input already transmitted or to be transmitted at the control target;
predicting a state of the control target at a time of arrival of the control input to be transmitted, for an individual one of the plurality of arrival patterns generated;
calculating a control input set by calculating a plurality of control inputs corresponding respectively to the plurality of states predicted; and
determining a control input to be outputted to the control target based on a result of statistical processing applied on the control input set calculated.

12. The remote control method according to claim 11, comprising,
in calculation of the control input set, calculating, for an individual one of a plurality of the states predicted, the control input set by calculating a plurality of control inputs, an individual one of the plurality of control inputs having the predicted state of the control target fed back thereinto.

13. The remote control method according to claim 11, comprising
in determination of the control input, determining the control input to be outputted to the control target, based on a statistical value indicating a variance of an element included in the control input set calculated and a representative value of the control input set calculated.

14. The remote control method according to claim 13, comprising
determining the control input by using a function directly proportional to the representative value of the control input set and monotonically decreasing with the statistical value indicating the variance.

15. The remote control method according to claim 13, comprising
determining the control input by calculating a correction term, a value of the correction term being large when the statistical value indicating the variance is small, while being small when the statistical value indicating the variance is large, and multiplying the correction term with the representative value of the control input set.

16. The remote control method according to claim 13, comprising
calculating an average value, a median, or a mode, as the representative value of the control input set.

17. The remote control method according to claim 11, comprising
generating the arrival pattern with a Monte Carlo simulation using a queuing model.

18. A non-transitory computer readable medium storing thereon a program causing a computer to perform processing comprising:
measuring a communication delay in a communication network based on a transmission time of a control input and a reception time of a state transmitted from a control target;
generating a probability distribution of the communication delay in the communication network based on a history of the communication delay measured;
generating, based on the probability distribution of the communication delay, a plurality of arrival patterns, an individual one thereof including, as an element, an arrival time of a control input already transmitted or to be transmitted at the control target;
predicting a state of the control target at a time of arrival of the control input to be transmitted, for an individual one of the plurality of arrival patterns generated;
calculating a control input set by calculating a plurality of control inputs corresponding respectively to the plurality of states predicted; and determining a control input to be outputted to the control target based on a result of statistical processing applied on the control input set calculated.

19. The non-transitory computer readable medium according to claim 18, storing thereon a program causing the computer to perform processing comprising in calculation of the control input set, calculating, for an individual one of a plurality of the states predicted, the control input set by calculating a plurality of control inputs, an individual one of the plurality of control inputs having the predicted state of the control target fed back thereinto.

20. The non-transitory computer readable medium according to claim 18, storing thereon a program causing the computer to perform processing comprising in determination of the control input, determining the control input to be outputted to the control target, based on a statistical value indicating a variance of an element included in the control input set calculated and a representative value of the control input set calculated.

\* \* \* \* \*